(12) United States Patent
Lesesky et al.

(10) Patent No.: US 7,434,643 B2
(45) Date of Patent: Oct. 14, 2008

(54) METHOD FOR DATA COMMUNICATION BETWEEN A VEHICLE AND A REMOTE TERMINAL

(76) Inventors: Alan C. Lesesky, 5518 McCallum Ct., Charlotte, NC (US) 28226; Bobby Weant, 2506 Celanese Rd., Apt. J, Rock Hill, SC (US) 29732

( * ) Notice: Subject to any disclaimer, the term of this patent is extended or adjusted under 35 U.S.C. 154(b) by 0 days.

(21) Appl. No.: 11/430,327

(22) Filed: May 8, 2006

(65) Prior Publication Data

US 2006/0213731 A1 Sep. 28, 2006

Related U.S. Application Data

(63) Continuation of application No. 10/130,456, filed on Aug. 6, 2002, now Pat. No. 7,040,435.

(51) Int. Cl.
*G08B 21/00* (2006.01)
(52) U.S. Cl. ........................................ 180/167; 340/431
(58) Field of Classification Search ................ 701/1, 701/29, 33, 36; 180/167; 439/34, 35; 340/431, 340/687; 307/9.1, 10.1, 11, 12
See application file for complete search history.

(56) References Cited

U.S. PATENT DOCUMENTS

| 5,025,253 | A | * | 6/1991 | DiLullo et al. ........... 340/10.41 |
| 5,385,476 | A | | 1/1995 | Jasper |
| 5,418,721 | A | * | 5/1995 | Arai et al. ..................... 701/35 |
| 5,442,810 | A | | 8/1995 | Jenquin |
| 5,488,352 | A | | 1/1996 | Jasper |
| 5,565,856 | A | * | 10/1996 | Takaba et al. .............. 340/3.32 |
| 5,732,074 | A | | 3/1998 | Spaur et al. |
| 5,739,592 | A | | 4/1998 | Rigsby et al. |
| 5,783,993 | A | | 7/1998 | Briski et al. |
| 5,794,164 | A | | 8/1998 | Beckert et al. |
| 5,900,803 | A | | 5/1999 | Politz et al. |
| 5,920,128 | A | * | 7/1999 | Hines ........................ 307/10.8 |
| 6,772,248 | B1 | | 8/2004 | McClure et al. |

FOREIGN PATENT DOCUMENTS

| WO | WO 97/17232 | 5/1997 |
| WO | WO 97/28988 A1 | 8/1997 |
| WO | WO 99/35009 | 7/1999 |

* cited by examiner

*Primary Examiner*—Christopher Ellis
*Assistant Examiner*—Brian Swenson
(74) *Attorney, Agent, or Firm*—Schwartz Law Firm P.C.

(57) ABSTRACT

An apparatus and methods are provided for data communications associated with a vehicle. The apparatus preferably includes at least one electronic subsystem associated with the vehicle and a plurality of electrical conductors connected to the at least one electronic subsystem and associated with the vehicle. A vehicle data communications protocol converter is preferably connected to the plurality of electrical conductors for converting a first data communications protocol associated with data communications along the plurality of electrical conductors to a second data communications protocol such as a local-area infrared or an RF data communications protocol. The apparatus also preferably includes a transceiver connected to the data communications protocol converter for transmitting the second data communications protocol from the vehicle and receiving the data communications protocol from a remote data communications terminal or another portion of the vehicle.

17 Claims, 27 Drawing Sheets

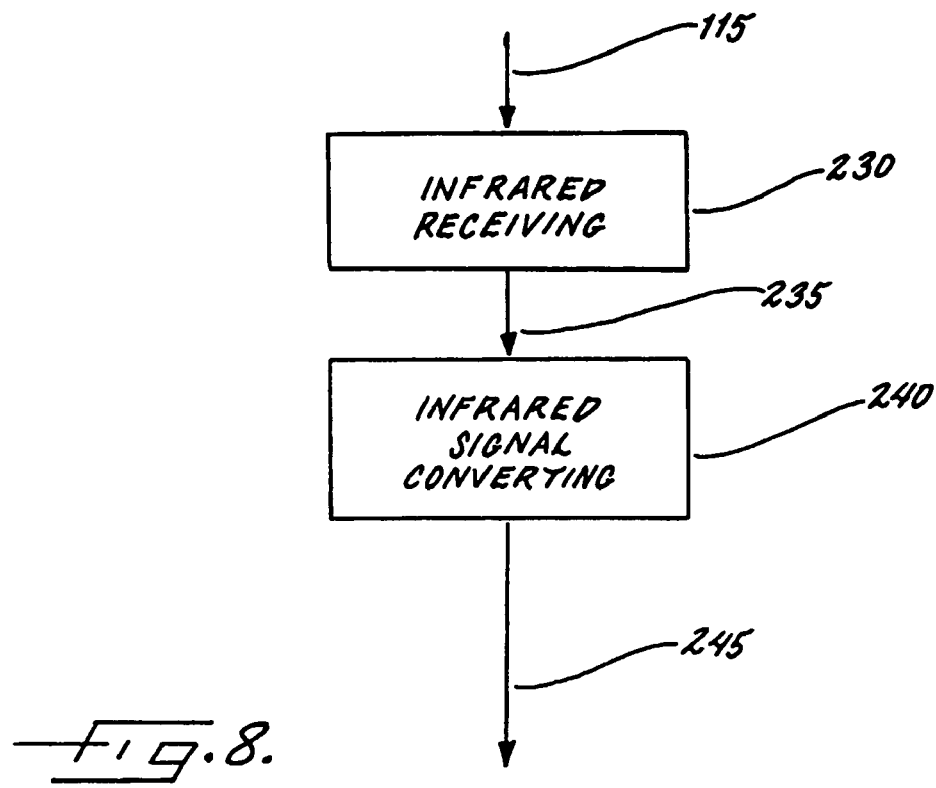
Fig. 8.
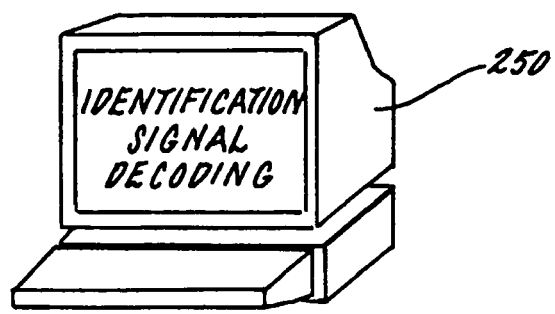
Fig. 9.
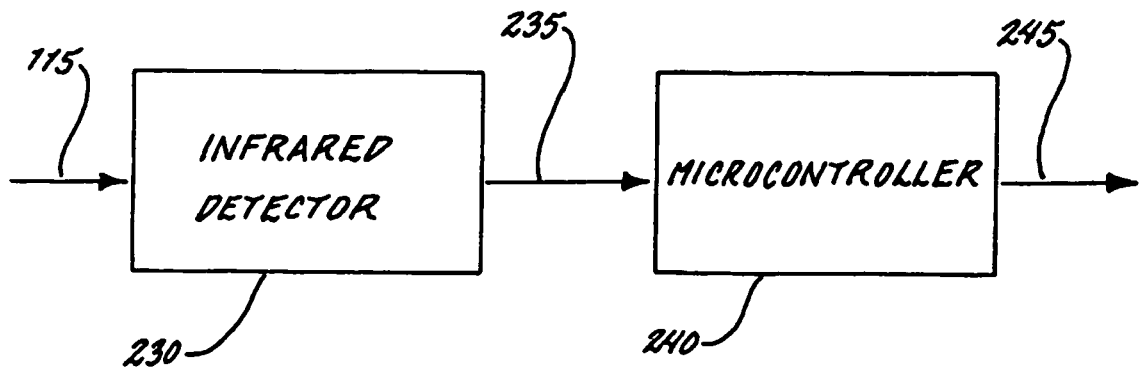

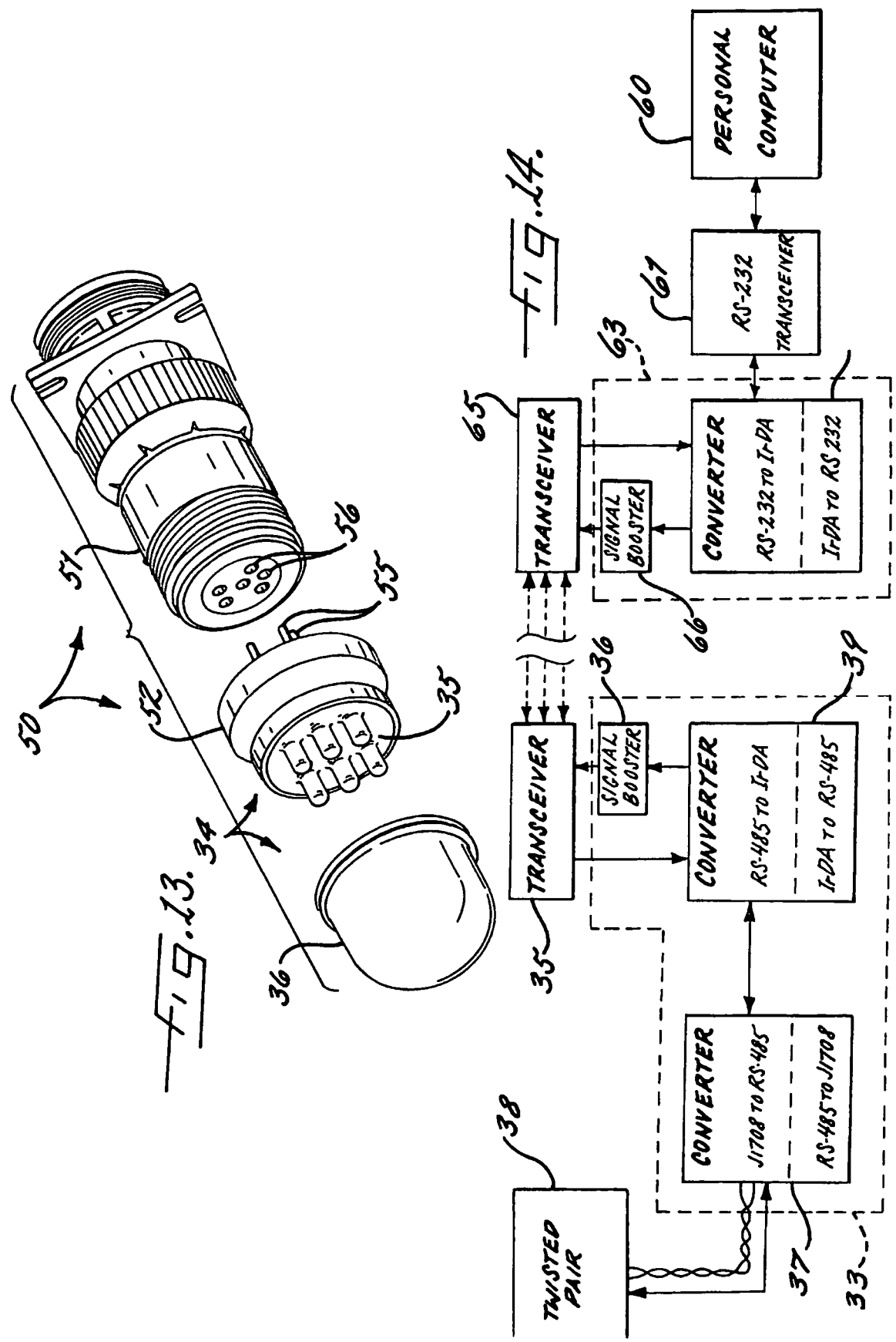

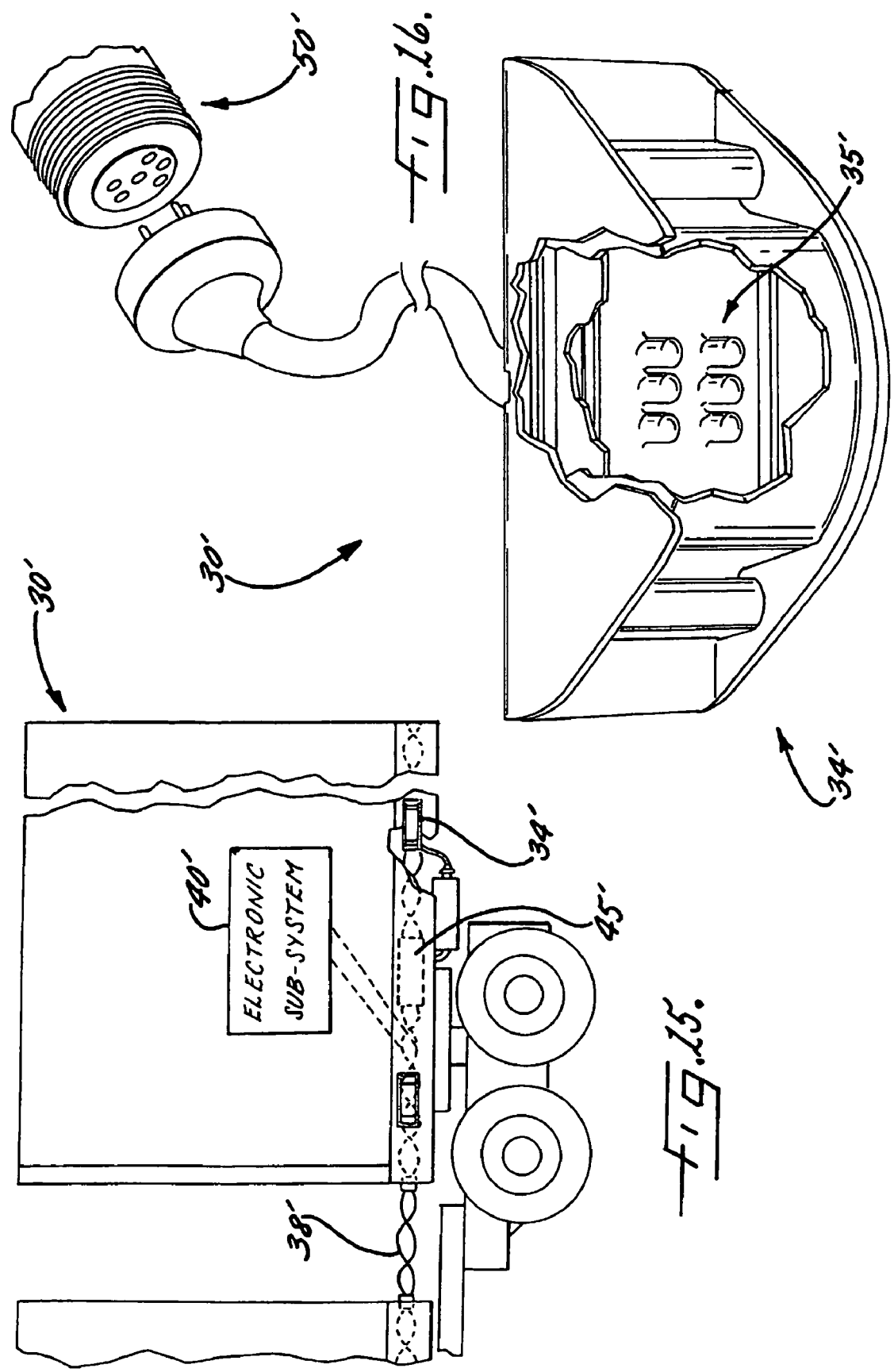

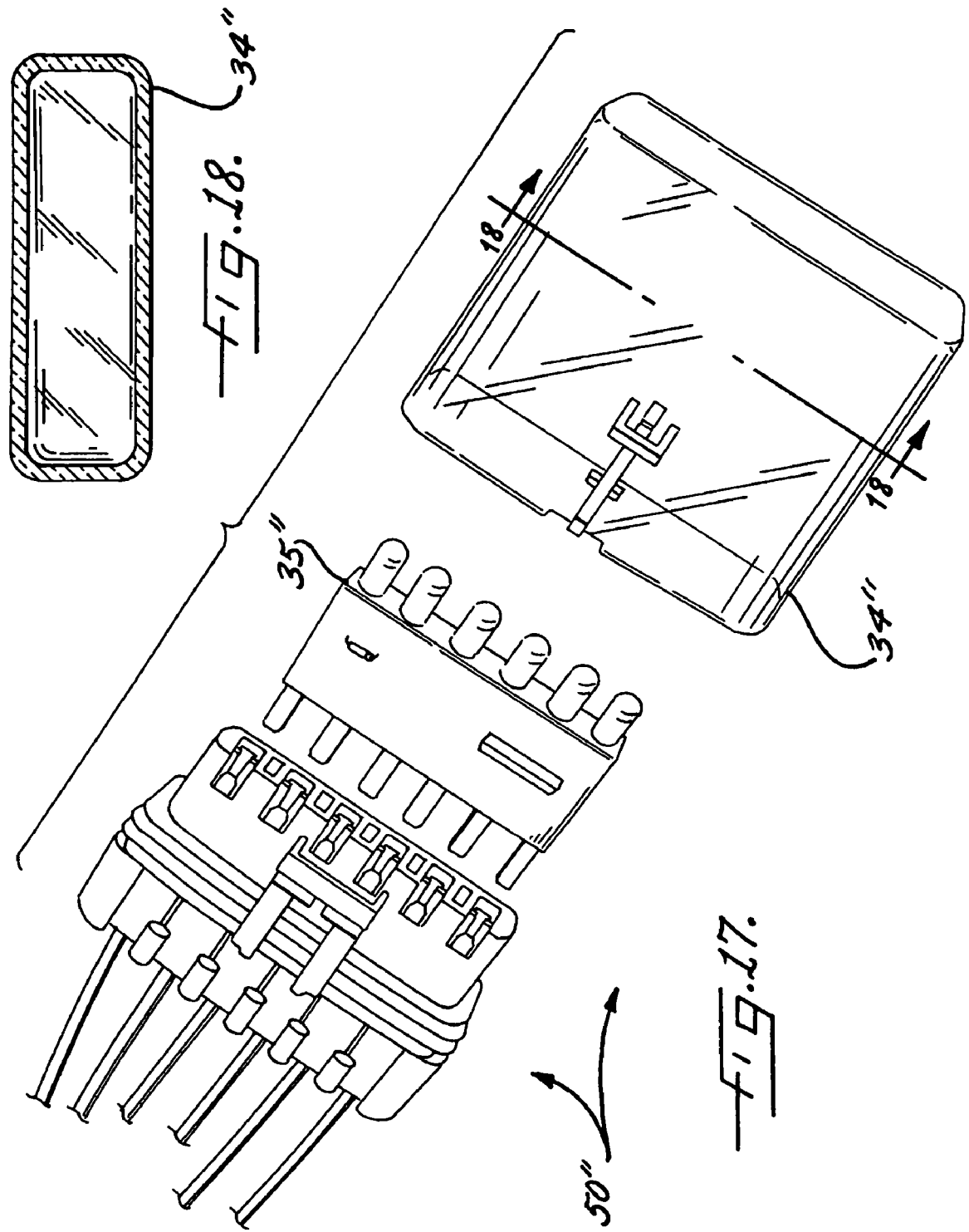

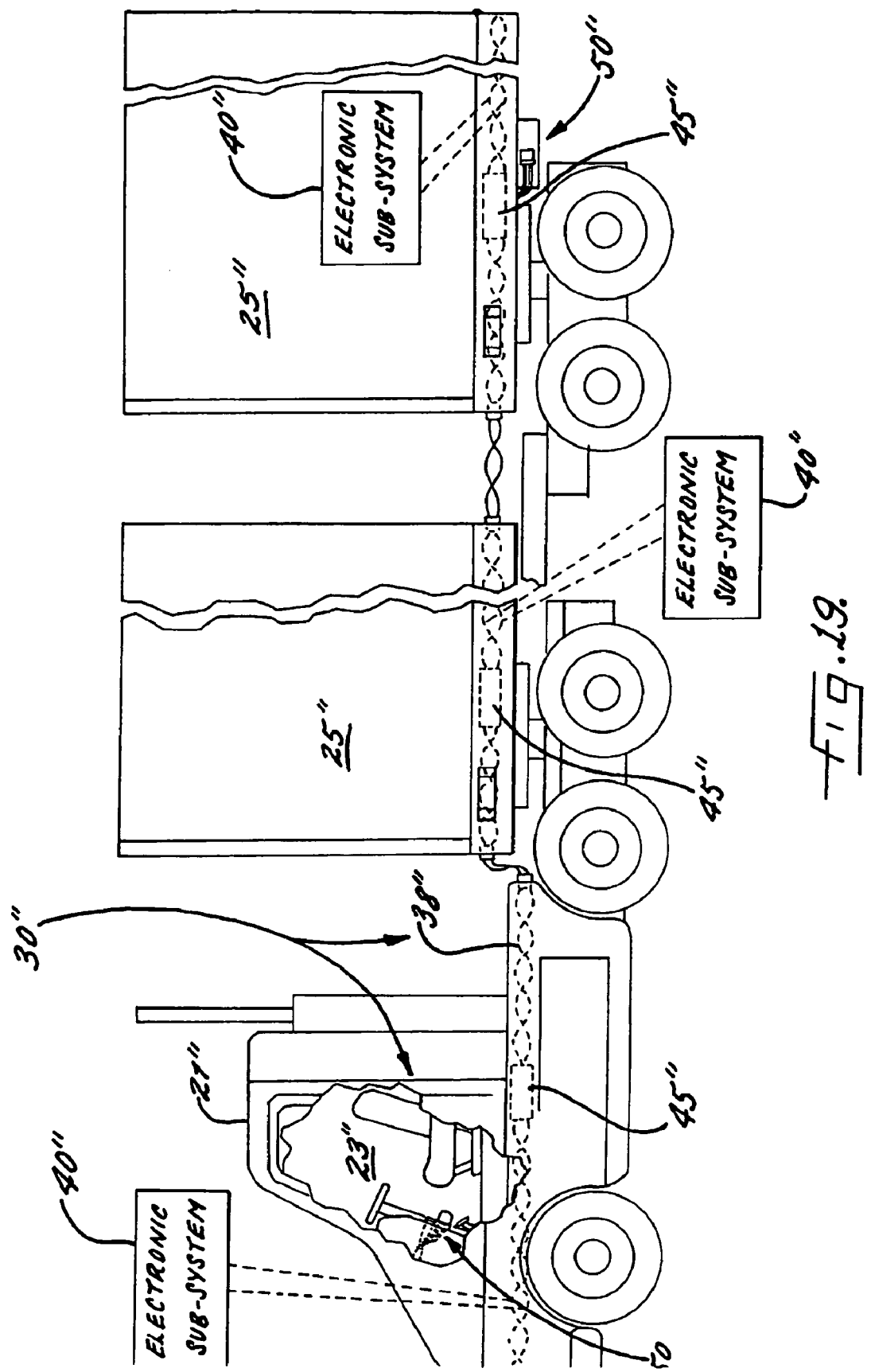

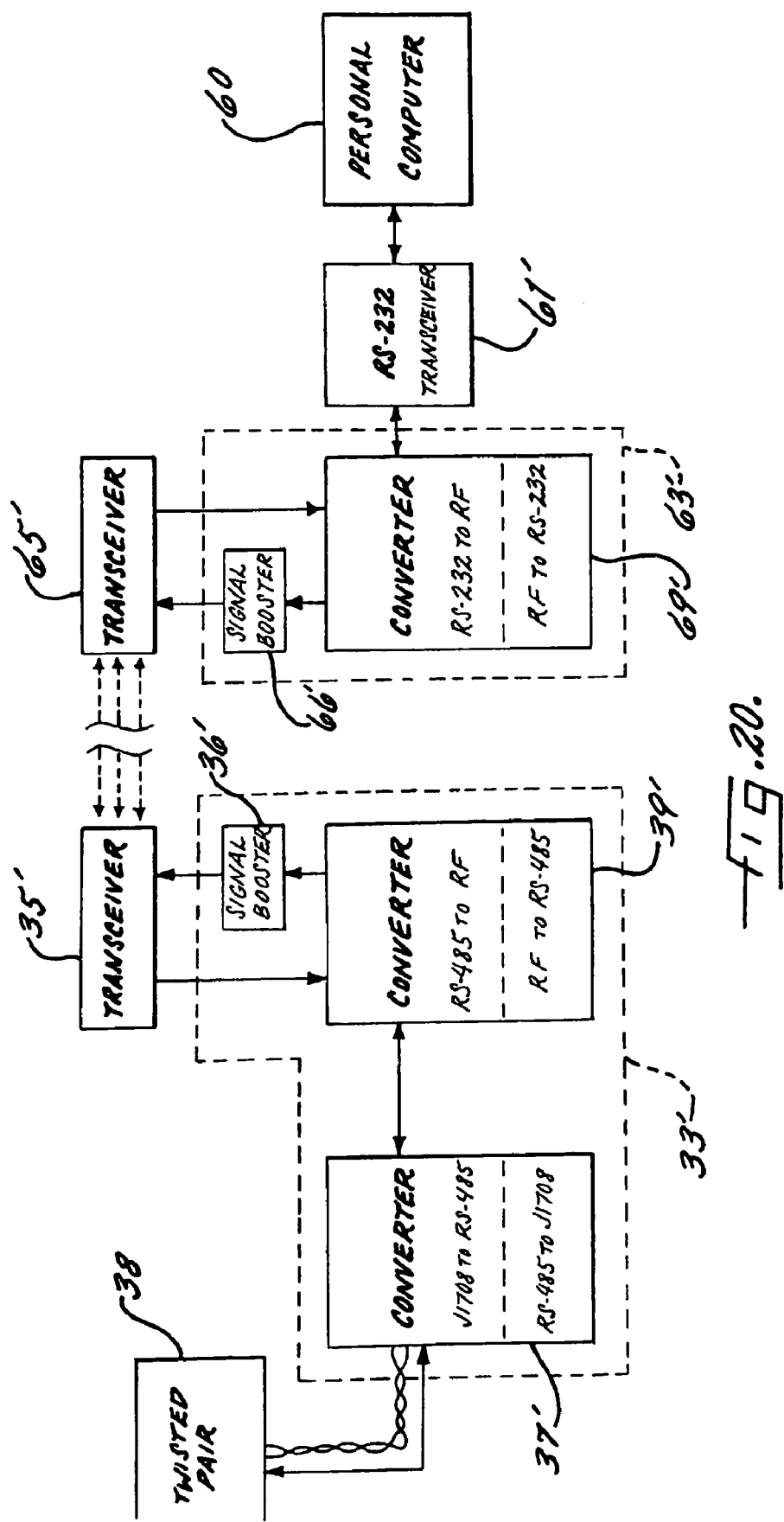

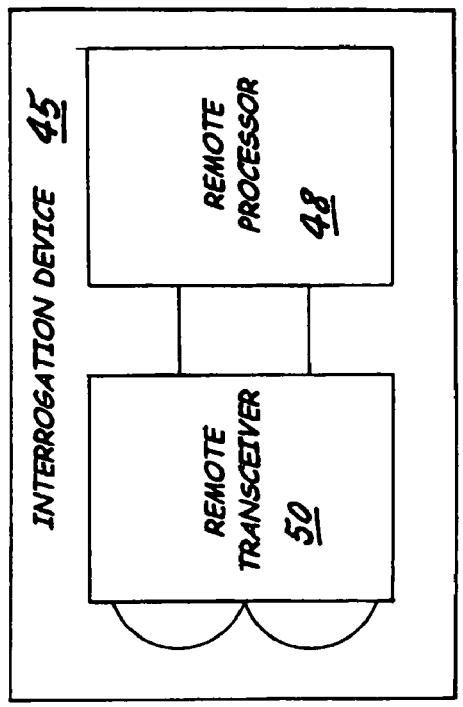
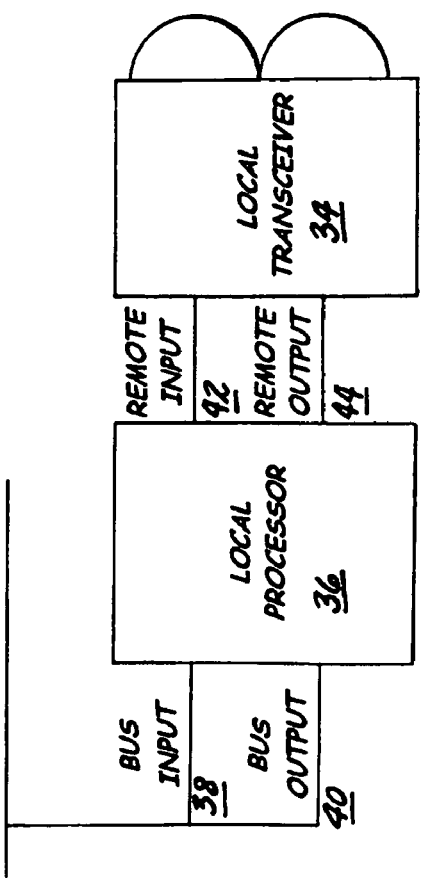
Fig. 23.

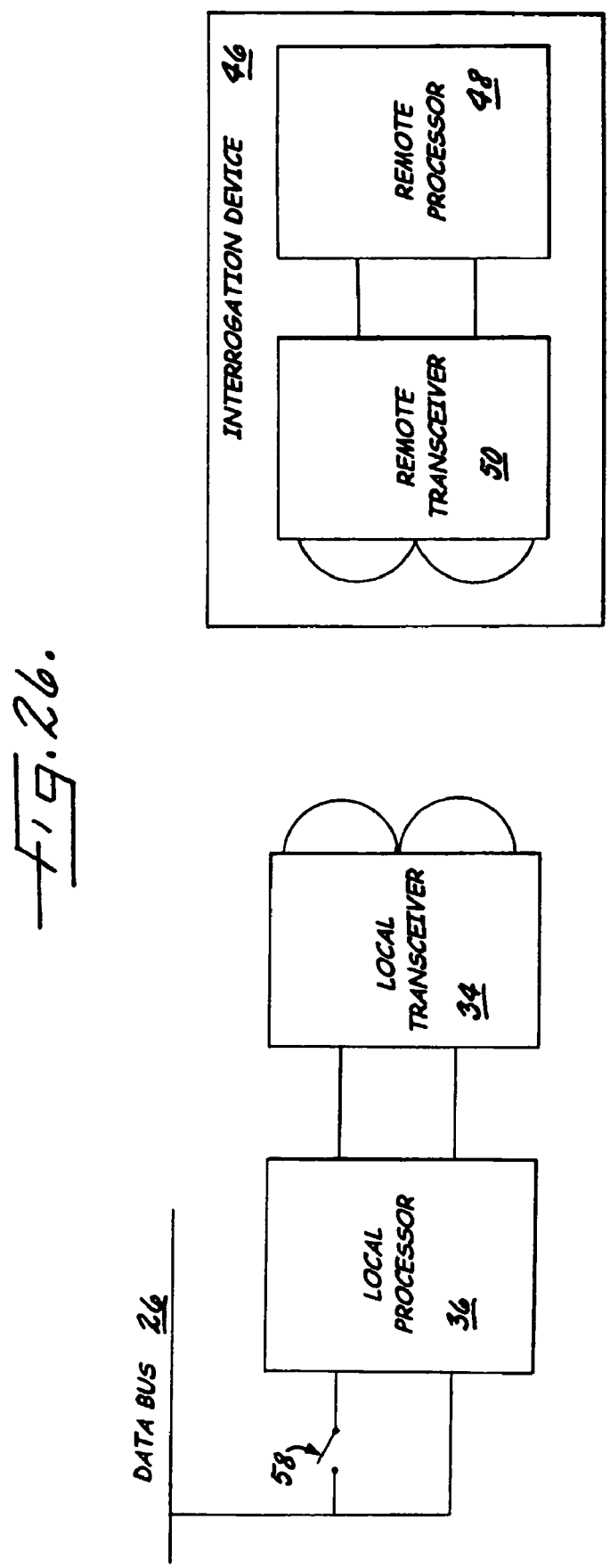

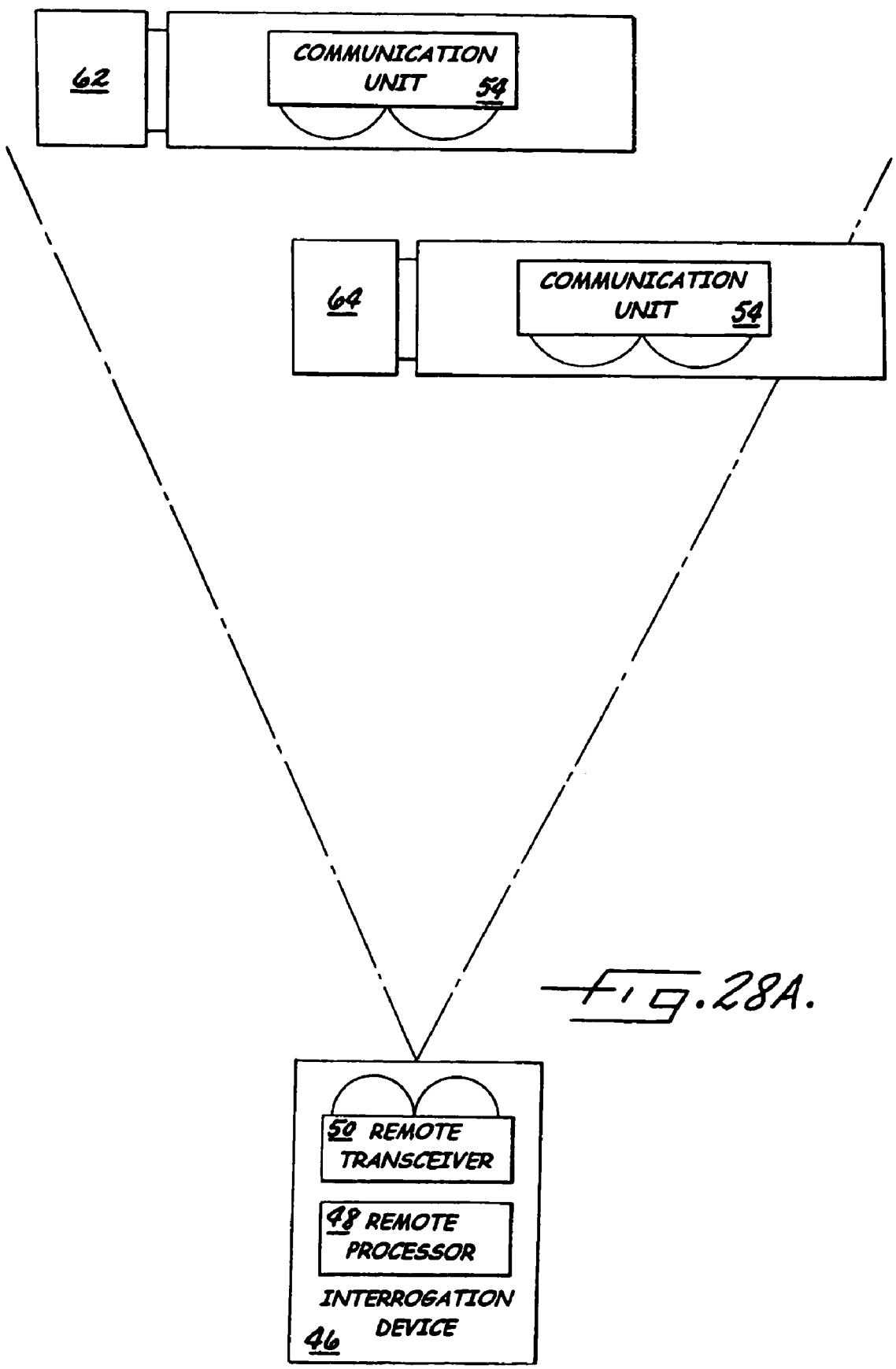

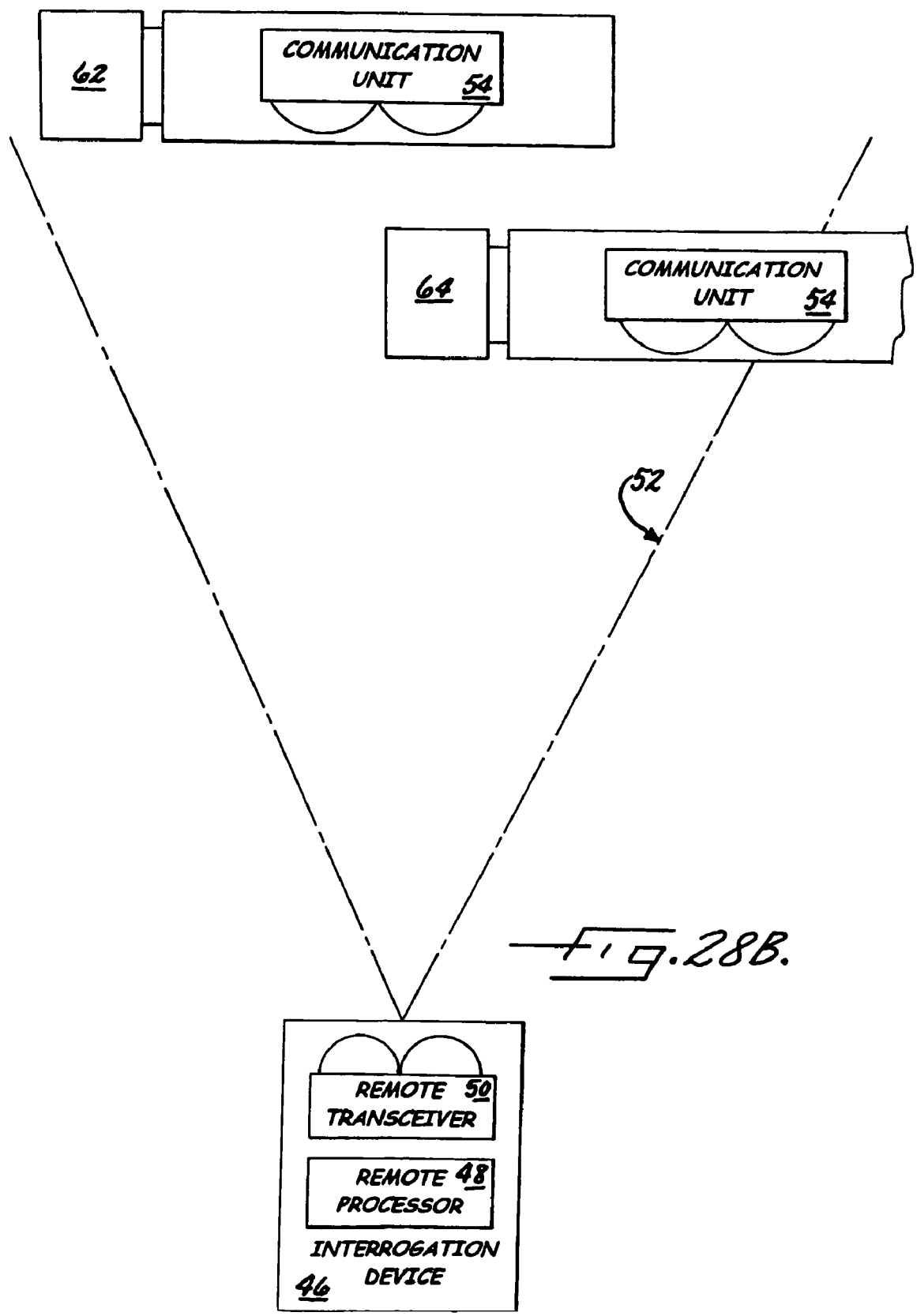

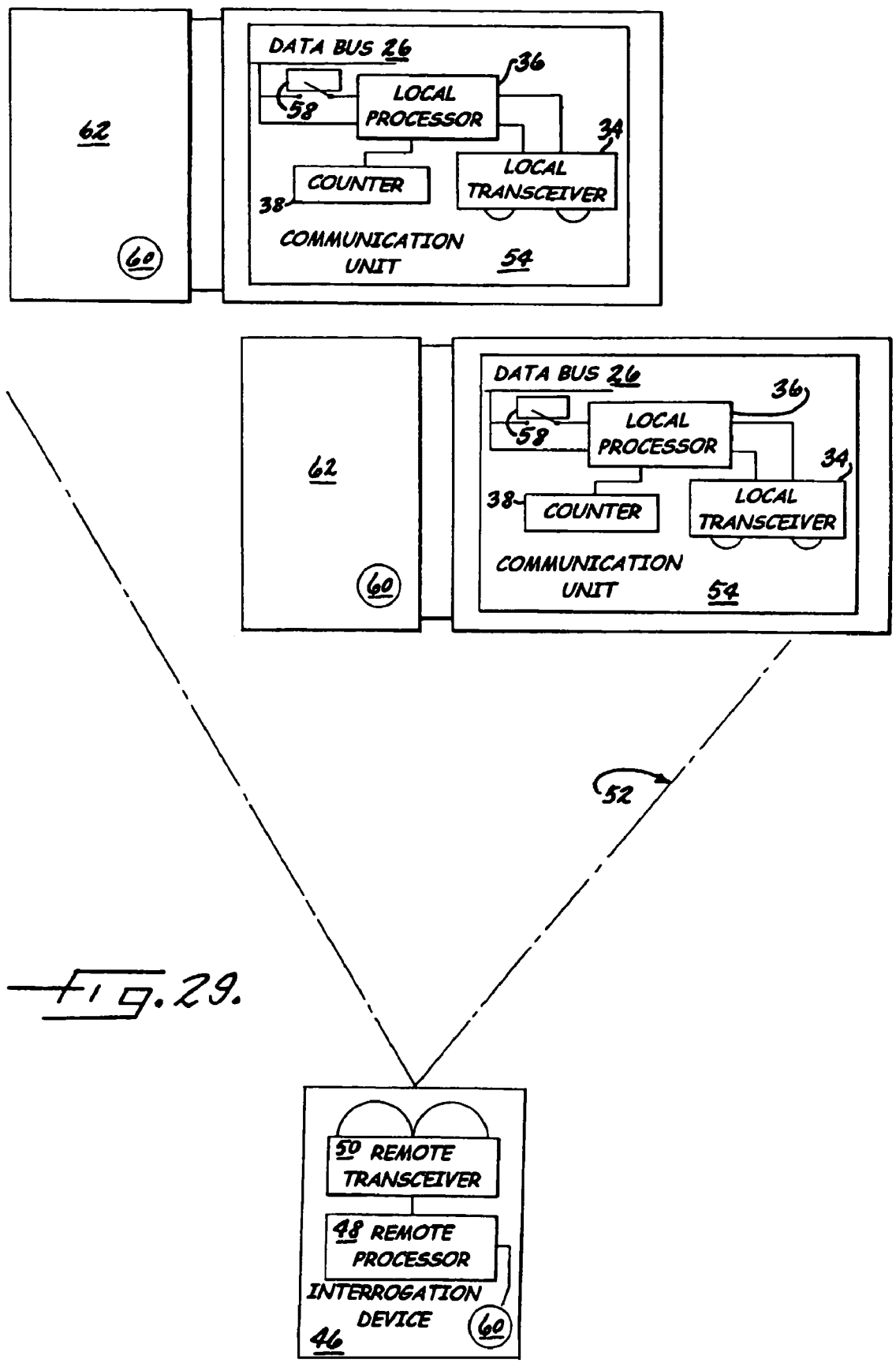

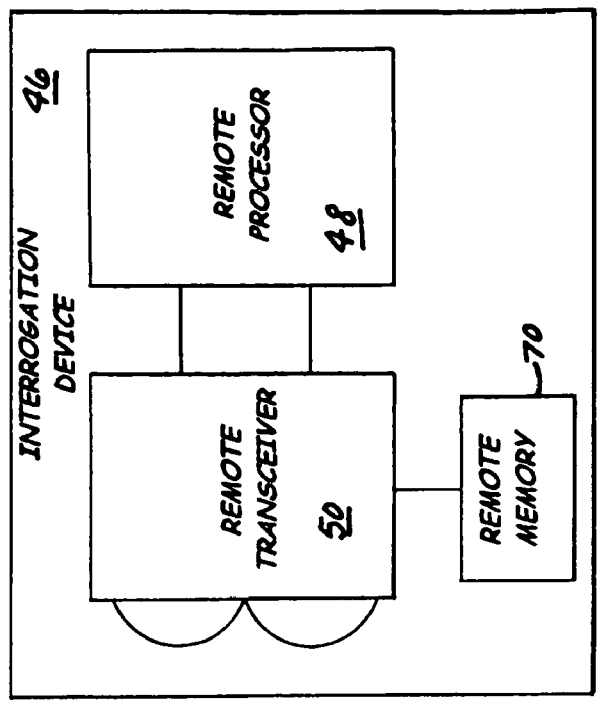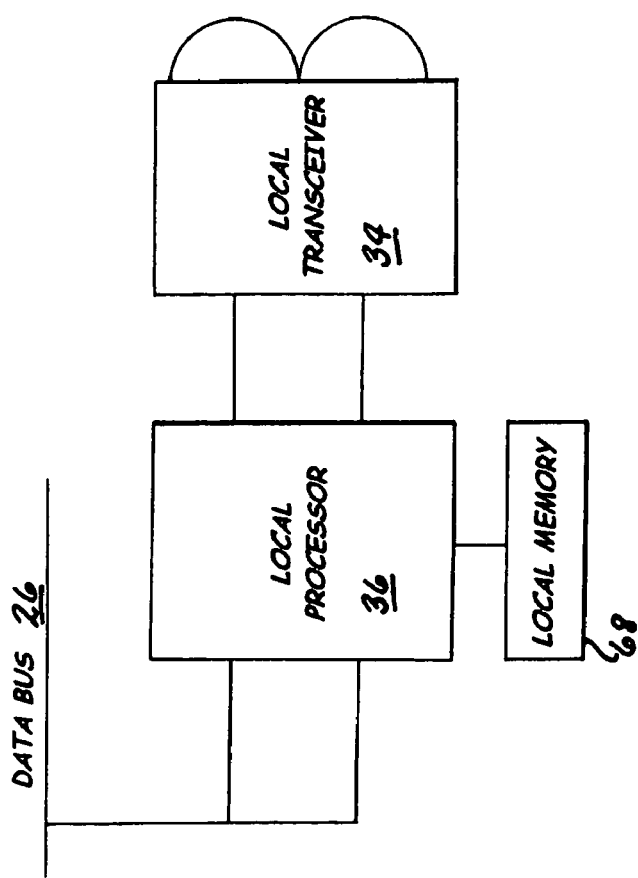
Fig. 31.

METHOD FOR DATA COMMUNICATION BETWEEN A VEHICLE AND A REMOTE TERMINAL

FIELD OF THE INVENTION

The present invention relates to the field of vehicle data communications and, more particularly, to data communications from a vehicle to a remote location.

BACKGROUND OF THE INVENTION

Data communications within vehicles has developed extensively over the years. The truck industry, for example, has for many years used tractor/trailer combinations to transport cargo over the roadways to intended destinations. As shown in FIG. 1, an ensemble of components, including a tractor 10 and a trailer 20 mechanically couple together so that the tractor can pull the trailer, from a vehicle 5, often referred to as a "rig," which can transport cargo in an efficient and cost effective manner. Various links between the tractor and the trailer provide vehicle subsystems with power and/or control signals to operate. Hydraulic, pneumatic, electrical, and other subsystems on the rig have associated electrical conductors and pneumatic lines running therebetween so these subsystems can operate. These electrical conductors and pneumatic lines typically include quick-disconnecting, standardized connectors and couplers so that rig components, such as tractors, trailers and dollies (the short trailers used to couple multiple trailer strings), may be easily interchanged.

Because connectors in rigs are standardized, a single tractor may be connected to and used to transport any number of different trailers throughout its operational life. Because of this interchangeability, components are frequently traded, loaned, and leased among users. For example, a trailer may be hauled to a first terminal or other delivery location where it is detached from the tractor which delivered it and connected to another tractor—the new rig destined for another terminal. Thus, a single trailer may be under the control of several different concerns, including trucking companies, railroads, overseas shippers, and truck brokers, and may be used by several different tractor/trailer operators. The same is true for other components, such as tractors, dollies, and shipping containers as well as many other types of vehicles.

Because of the interchangeability and mobility of these components, trucking companies, freight brokers, law enforcement officials, and others involved in the transport industry have developed methods to track rigs and their components. While trucking companies and other shippers desire to keep track of cargo and rolling stock, law enforcement and other regulatory agencies desire to monitor truck licensing, ownership, cargo content, and driver workloads. Techniques have been developed for tracking rigs and their components as the rigs travel between cargo terminals, delivery points, weigh stations, and the like, but these techniques generally are cumbersome and limited in effectiveness and information capacity. Many tractors, trailers, and other components are identified using simple numbering systems, i.e., a serial or other number is painted on or otherwise applied to a surface of the component. These numbers typically are read and recorded by human operators—a time-consuming process which represents an undesirable inefficiency in an industry in which time is usually critical. Besides being inefficient, the human link in the accounting process increases the chances for error and omission, particularly under conditions of darkness or obscured visibility.

In addition, a serial or other identification number may fail to convey a complete identity. Cargo contained within a trailer generally is not identifiable by the trailer's identification number absent a predetermined cross-reference between the number and the cargo. Although such a cross-reference typically can be supplied through a freight management database, elaborate communications systems and recording procedures may be required to ensure data integrity. Failures in the link of the accounting chain may result in erroneous component and cargo designations leading to confused shipments and misplaced components.

Bar-code or magnetic-stripe identification systems reduce the human error involved in the use of numbering systems, but have drawbacks of their own. Because of the need to make codes or magnetic stripes accessible to readers, codes and stripes are typically affixed to surfaces of the rig which are exposed to wind, rain, salt, and other environmental contaminants which may render the codes or stripes unreadable. In addition, reading a bar code or magnetic stripe typically requires close proximity between the reader and the code or stripe, generally precluding remote reading or reading while the rig is in motion. Moreover, bar codes and magnetic stripes have a relatively limited informational capacity.

Accordingly, there is a need for improved systems and methods for identifying rigs and their components which have a high information transfer capacity and which can dependably and accurately operate in the demanding environments in which the rigs typically operate. Moreover, these methods should be inexpensive and easily retrofitted onto existing equipment without major compatibility problems.

Additionally, various links between the tractor and the trailer provide vehicle subsystems, e.g., hydraulic, pneumatic, or electrical, with power and/or control signals to operate effectively. These subsystems have associated electrical conductors, pneumatic lines, or hydraulic lines extending between the tractor and trailer(s) so that these subsystems can effectively operate.

Data communications between a tractor and trailer for these subsystems also has been developed. An example of this data communications can be seen in U.S. Pat. No. 5,488,352 by Jasper titled "Communications And Control System For Tractor/Trailer And Associated Method" which is assigned to the common assignee of the present application. As described in this patent, the use of the Society of Automotive Engineering ("SAE") standard J1708 titled "Serial Data Communications Between Microcomputer Systems In Heavy Duty Vehicle Applications" and SAE standard J1939 are also known for data communications in the heavy duty vehicle environment.

Only recently, however, has the heavy duty vehicle industries begun to use sophisticated electrical electronic subsystems in and associated with these vehicles to perform varied tasks that usually involve data manipulation and transmission. Previously, computers, controllers, and computer-type electrical systems were simply not found in these vehicles, such as the tractor and trailer combinations or recreational vehicles, in a significant manner. Much of this previous slow, or lack of, development and advances could be attributed, for example, to the lack of governmental or other authoritative initiatives which would have otherwise required systems to be installed on these heavy duty vehicles to include sophisticated electronics and data communications.

Although only recently have advances been made with data communications in the heavy duty vehicle industries, many of the advances require extensive retrofitting or extensive additions to the heavy duty vehicle. Accordingly, many vehicle owners have been hesitant to adopt and purchase sophisticated electronics and data communications because of the expense and uncertainty with the advances in the technology. Yet, having the capability to monitor and communicate with the various electronic subsystems of a heavy duty vehicle such as a tractor-trailer truck or recreational vehicle can be beneficial to the driver, the owner, governmental officials or agencies, and others having an interest in the heavy duty vehicle industries.

Still further, many of today's vehicles are equipped with sophisticated computer systems. These computer systems typically include a central computer that receives data from sensors located throughout the vehicle. The sensors record data information concerning systems of the vehicle, and the central computer system uses this information to control the operation of the vehicle, store the data for historical purposes, and/or analyze the data for diagnostic purposes. For example, many vehicles include central computer systems that receive data from sensors such as throttle sensors, oxygen sensors, and fuel flow sensors to regulate the engine.

In addition to providing data for operation of the vehicle, many vehicle computer systems include sensors that provide data concerning the various systems of the vehicle for use in diagnostic and maintenance. For example, many heavy duty vehicles now include sensors that provide data relating to safety systems, such as the status of the brakes of the vehicle. Additionally, many systems provide logistics data relating to the vehicle, such as mileage, fuel tank levels, fuel mileage, status of contents hauled in the vehicle, etc.

To access data from the computer system, many of today's vehicles include electrical pin-out connectors that are accessible for connection. In these systems, a diagnostic device may be connected to the pin-out connector to receive and transmit data to and from the onboard computer of the vehicle. In light of this, several interrogation devices have been created in the past few years that interface with the pin-out connector of a vehicle and transmit and receive data relating to the operation of the vehicle and status of its various systems. Although these conventional systems are effective for receiving data from and transmitting data to the data bus of the vehicle, these interrogation devices require physical connection to the vehicle, which may not be desirable in situations where the vehicle is either in transit or is remote from the interrogation device requesting data input.

Although remote, wireless communication with the computer system of a vehicle is typically desired, the physical limitations of the communication infrastructure of most vehicles hinder the move to wireless communication. For instance, the communication systems of many conventional vehicles, such as heavy duty vehicles (e.g., tractor-trailer vehicles) use communication protocol that requires real-time communication with the vehicle. Specifically, many heavy duty vehicles include a data bus that is operated using one of two bus standards, either SAE J1708 or J1939. Communication on the data bus of these vehicles may be problematic due to the nature of the J1708 and J1939 standards. For example, a data bus that uses the J1708 standard is a differentially driven, twisted pair. The data bus of this system is half duplexed such that data transmitted on the data bus is transmitted on both of the twisted pair of wires, where the data transmitted on one of the twisted pair of wires is mirrored with respect to the other twisted pair wire. Because data transmitted on the bus is transmitted on both wires of the bus, the data bus does not have a transmit and receive line. Further, systems wishing to transmit data on the data bus must monitor the data bus for an idle state where data is not being transmitted, before the system transmits data on the data bus.

As discussed, many conventional interrogation or other types of data communication devices have been designed for use in direct electrical communication with the data bus of a vehicle. These systems, to some extent, do not experience problems with the infrastructure or protocol of the data bus because they are in direct electrical connection with the data bus. This direct electrical connection allows these systems to monitor the idle states of the data bus in real-time. For this reason, in the past few years several interrogation devices have been developed for transmitting and receiving data from the data bus of a vehicle using direct electrical communication with the data bus. Importantly, these interrogation devices typically use software programs that are specifically designed to interface with the data bus in real-time. The software programs monitor the bus for idle states and transmit data to the bus. These systems, however, still have extensive limitations.

SUMMARY OF THE INVENTION

With the foregoing in mind, the present invention advantageously provides an apparatus and methods of data communication between a vehicle and a remote data communication terminal so that various operating characteristics of the vehicle can be monitor or observed. The present invention also advantageously provides an apparatus and methods of data communication for discretely and compactly communicating data between a vehicle and a remote data communication terminal. The present invention additionally provides an apparatus and method of data communication which is readily adapted to existing vehicle data communication technology and does not require either extensive retrofitting or extensive and expensive additions to existing vehicle data communication technology. The present invention further advantageously provides an apparatus and methods of data communication so that when the apparatus is mounted to a vehicle a third party would not readily recognize that the vehicle is equipped for data communications from the vehicle to a remote data communications terminal. The present invention still further advantageously provides vehicle identification systems and methods for identifying vehicles such as tractor/trailer rigs and components thereof which are accurate under low light and other visibility-obscuring conditions, which are resistant to electromagnetic interference, and which may identify a tractor/trailer rig and components thereof when the tractor/trailer rig is in motion.

Yet additionally, the present invention provides several apparatus, methods, and computer program products that establish a data communication link between a remote interrogation device and the data bus of a vehicle with reduced transmission delay. Due to this reduced transmission delay, modifications to the existing software of the interrogation device are not necessary. As such, remote, wireless interrogation devices may be designed or retrofitted in a cost effective manner. Additionally, the present invention provides apparatus and methods that isolate the data bus of a vehicle from the transceiver used for remote wireless communication when a data communication link is not established, such that spurious signals are not applied to the data bus.

These and other objects, features and advantages of the present invention are provided by vehicle identification systems and methods in which an optical identification signal representing an identity of a vehicle, for example a tractor/trailer rig, is produced by optical wavelength carrier communicating means located on the vehicle, from which an identity of the vehicle may be determining means positioned external to the vehicle. The optical identification signal includes an optical wavelength carrier signal, preferably from the infrared portion of the optical spectrum. Preferably, the optical wavelength carrier communicating means includes identification signal generating means for generating an identification signal representing an identity of the vehicle and an optical transmitter for producing the optical identification signal. The identification system may further comprise an indicator in which the optical transmitter may be retained with the indicator including means for mounting the indicator on the vehicle. Preferably, the indicator, such as an existing marker or lamp on a trailer or a tractor, preferably includes an indicator housing which includes means for retaining the optical transmitter within the indicator such that the optical transmitter is concealed. More preferably, the indicator housing preferably has an inconspicuous standard truck light form factor similar to the running or clearance lights commonly used on vehicles.

The present invention thus provides rapid and accurate identification of a vehicle without requiring the intervention of a human operator who has high associated labor costs and is prone to error. Unlike identification systems which require close proximity to the vehicle, such as bar code and magnetic stripe systems, the present invention provides for remote identification and identification when the vehicle is moving at high rates of speed and during periods of darkness or obscured visibility. A reasonable range for identification is provided, even under conditions of rain, fog, and mist, without the interference and regulatory concerns which are often attendant to radio frequency communications techniques. Concealing the optical transmitter within a standard form factor indicator renders the identification system less conspicuous and less vulnerable to damage and theft.

In particular, a vehicle identification system according to the present invention includes a vehicle. Optical wavelength carrier communication means located on the vehicle produces an optical identification signal representing an identity of the vehicle. The optical identification signal includes an optical wavelength carrier signal. Preferably, the optical wavelength carrier signal includes a near infrared wavelength carrier signal, more preferably an optical wavelength carrier signal having a wavelength between 700 nanometers and 1400 nanometers. Identity determining means positioned external to the vehicle determine an identity of the vehicle from the optical identification signal.

The optical wavelength carrier communicating preferably includes identification signal generating means for generating an identification signal representing an identity of the vehicle and an optical signal from the generated identification signal. The optical transmitter preferably includes an array of optical emitting diodes and a modulator which modulates the diode array to produce the optical identification signal. The array of optical emitting diodes preferably includes infrared emitting diodes, more preferably gallium aluminum arsenide infrared emitting diodes having peak gain for wavelengths between approximately 700 nanometers and approximately 1400 nanometers.

According to a "Standalone ID Tag" aspect of the present invention, the indicator includes an indicator housing which retains the identification signal generating means and the optical transmitter within the indicator. The resulting combination provides a simple, low-cost "tag" for identifying a vehicle or component. The tag may be easily connected to a power bus, for example, using an existing running or clearance light location. Existing equipment may thus be easily and inexpensively retrofitted with such standalone tags.

A data communication apparatus for a vehicle is also provided according to the present invention. Although the vehicle is preferably a heavy duty vehicle such as is preferably a tractor and a trailer connected to the tractor. The tractor preferably includes a cab. The data communications apparatus is preferably connected to the tractor and the trailer for communicating data to and from the tractor and the trailer to a remote data terminal. The data communications apparatus preferably includes a plurality of electrical conductors associated with and extending between the tractor and the trailer. A connector is connected in series with the plurality of electrical conductors and, for example, can be positioned in the cab of the tractor or outside of the tractor or trailer or other portions of a vehicle such as in a side light marker. The apparatus also includes vehicle data communications protocol converting means connected to the plurality of electrical conductors for converting a first data communications protocol used to communicate data along the plurality of electrical conductors to a second data communications protocol. For example, the second data communications protocol is preferably one of either an infrared data communications protocol or a radio frequency ("RF") data communications protocol. A first transceiver is associated with the connector and is connected to the vehicle data communications protocol converting means for transmitting and receiving the second data communications protocol. A remote data communication terminal which preferably includes a second transceiver for transmitting the second data communications protocol to the first transceiver and receiving the data communications protocol from the first transceiver.

A method of data communications associated with a heavy duty vehicle is also provided according to the present invention. The method preferably includes providing a plurality of electrical conductors associated with a heavy duty vehicle and converting a first data communications protocol associated with data communications along the plurality of conductors to a second data communications protocol. The second data communications protocol is preferably one of either an infrared data communications protocol or a radio frequency ("RF") data communications protocol. The method also includes transmitting the data communications protocol from the heavy duty vehicle to a remote data communications terminal.

Further, the present invention provides apparatus and methods that facilitate data communication with a vehicle, when the vehicle is located within the transmission and reception range of the interrogation device. Also, the present invention provides apparatus and methods that can facilitate establishment of a data communication link with one vehicle in environments where several vehicles are within the transmission and reception area of the interrogation device.

As discussed above, on problem with conventional retrofit interrogation devices is the need to update or reprogram the existing software to accommodate for delays associated with wireless transmission of data. To remedy problems associated with wireless data transmission delays, the present invention provides an apparatus for validating data transmitted to and data transmitted from a data bus, such that receipt of false data either by the data bus or the remote location is eliminated. Further, the present invention analyzes the data bit by such that the data is transmitted in a wireless format with minimal delay.

The apparatus of this embodiment includes a transceiver in operable electrical communication with the data bus of the vehicle. This transceiver is used to transmit data from the data bus to a remote location and receive data transmitted to the data bus from a remote location. Connected to the receiver is a processor that analyzes data either transmitted to or received from the data bus.

In operation, the processor analyzes data received by the Micro processor one bit at a time to decrease delay in a data processing. Additionally, the Micro processor analyzes the data received by the processor and prevents propagation of false data from being applied to either the data bus or to the remote location. As such, the apparatus of the present invention allows for wireless data communication with minimal delay, while also alleviating problems associated with receipt of false data.

In one embodiment, the processor of the present invention decreases the delay for transmission of data by monitoring the edge of each bit. Specifically, the Micro processor of this embodiment determines the value of each bit of the data by sensing transition in logic states in the data, such that the processor processes the data with minimal delay.

In addition to providing an apparatus and method for establishing a data link having minimal delay between a data bus of a vehicle and a remote interrogation device, the present invention also provides computer program products. Specifically, the present invention provides a computer-readable storage medium having computer-readable program code means embodied in the storage medium. The computer-readable program code means include first computer-readable program code means for analyzing data transmitted to and from the data bus one bit at a time such that data may be transmitted to and from the data bus with minimal delay. The computer-readable program code means also includes a second computer-readable program code means for preventing propagation of false data to the remote location when data is transmitted to the data bus and propagation of false data to the data bus when data is transmitted from the bus to the remote location.

In addition to providing apparatus, methods, computer program products that validate with minimal delay data transmitted to and from the data bus of a vehicle, the present invention also provides apparatus and methods for establishing a data communication link between a data bus of a vehicle and a remote interrogation device where unwanted signals may be received by the data bus and corrupt data on the data bus. The apparatus of this embodiment includes a local transceiver in operable electrical communication with the data bus of a vehicle for transmitting data to and transmitting data from the bus. Connected to both the transceiver and the data bus is a local processor. The apparatus of this embodiment also includes a switch in operable electrical communication with the local processor, local transceiver, and the data bus. The switch has a closed position in which it connects the local transceiver and the data bus and an open position in which it isolates the local transceiver from the data bus.

In operation, when a data link is to be established between the data bus of a vehicle and a remote interrogation device, the processor closes the switch such that the data bus may receive data transmitted to the vehicle via the local transceiver. Importantly, in instances in which data is not transmitted to the data bus of the vehicle, the local processor opens the switch to thereby isolate the data bus from the transceiver. As such, the apparatus of the present invention allows for remote data communication with the data bus of the vehicle, while also allowing the data bus to be isolated from outside noise signals, when the data bus is not receiving external data signals to thereby alleviate corruption of existing data on the data bus.

As discussed above, the present invention provides an apparatus and method for isolating the data bus from external noise when the data bus is not receiving external data. In some embodiments of the present invention, it is advantageous to alert the local processor that a remote interrogation device is attempting to form a data link with the data bus of the vehicle, such that the processor will close the switch connecting the data bus to the local transceiver. In this embodiment of the present invention, the apparatus further includes a remote interrogation device having a remote transceiver in electrical communication with a remote processor for transmitting to and receiving data from the data bus of the vehicle.

In operation, in a data transfer mode in which the remote interrogation device attempts to establish a data communication link with the data bus of the vehicle, the remote processor transmits a data link command to the local processor. Upon receipt of the data link command, the local processor closes the switch to thereby establish a data communication link between the data bus of the vehicle and the remote processor of the interrogation device.

BRIEF DESCRIPTION OF THE DRAWINGS

Some of the objects and advantages of the present invention having been stated, others will become apparent as the description proceeds when taken in conjunction with the accompanying drawings in which:

FIG. 8 illustrates operations for determining an identity of a vehicle from an optical identification signal according to an embodiment of the present invention;

FIG. 9 illustrates operations for receiving an optical identification signal and converting the received signal according to the present invention.

FIG. 13 is an exploded perspective view of a connector, a transceiver housing, and a transceiver of an apparatus for data communications between a vehicle and a remote data communications terminal according to a first embodiment of the present invention;

FIG. 14 is a schematic block diagram of an apparatus for data communications between a vehicle and a remote data communications terminal according to the present invention;

FIG. 15 is a fragmentary side elevational view of an apparatus for data communications between a vehicle and a remote data communications terminal according to a second embodiment of the present invention;

FIG. 16 is an enlarged perspective view of a vehicle light housing in the form of a vehicle side light marker housing having portions thereof broken away for clarity and having a transceiver positioned therein of an apparatus for data communications between a vehicle and a remote data communications terminal according to a second embodiment of the present invention;

FIG. 17 is an enlarged perspective view of a connector, a transceiver housing, and a transceiver positioned in the transceiver housing of an apparatus for data communications between a vehicle and a remote data communications terminal according to a third embodiment of the present invention;

FIG. 18 is a sectional view of a transceiver housing of an apparatus for data communications between a vehicle and a remote data communications terminal taken along line 9-9 of FIG. 8 according to a third embodiment of the present invention;

FIG. 19 is a side elevational view of an apparatus for data communications between a vehicle and a remote data communications terminal according to a third embodiment of the present invention;

FIG. 20 is schematic block diagram of an apparatus for data communications between a vehicle and a remote data communications terminal according to the present invention;

FIG. 23 is a block diagram of an apparatus for validating with minimal delay data transmitted to a data bus of a vehicle from a remote location and data transmitted from the data bus of the vehicle to a remote location according to one embodiment of the present invention;

FIG. 26 is a block diagram of an apparatus for establishing a data communication link between a data bus of a vehicle and a remote interrogation device where unwanted signals may be received by the data bus and corrupt data on the data bus according to one embodiment of the present invention;

FIG. 28A-28C are top views illustrating different scenarios for placement of vehicles in relation to a remote interrogation device for which the present invention can establish a data communication link between a data bus of one of the vehicles and the remote interrogation device according to various embodiments of the present invention;

FIG. 29 is a block diagram of an apparatus for establishing a data link between a data bus of one of at least two vehicles and an interrogation device having a remote processor and a remote transceiver according to one embodiment of the present invention;

FIG. 31 is a block diagram of the operations performed to established a data link between a data bus of one of at least two vehicles and an interrogation device having a remote processor and a remote transceiver according to one embodiment of the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
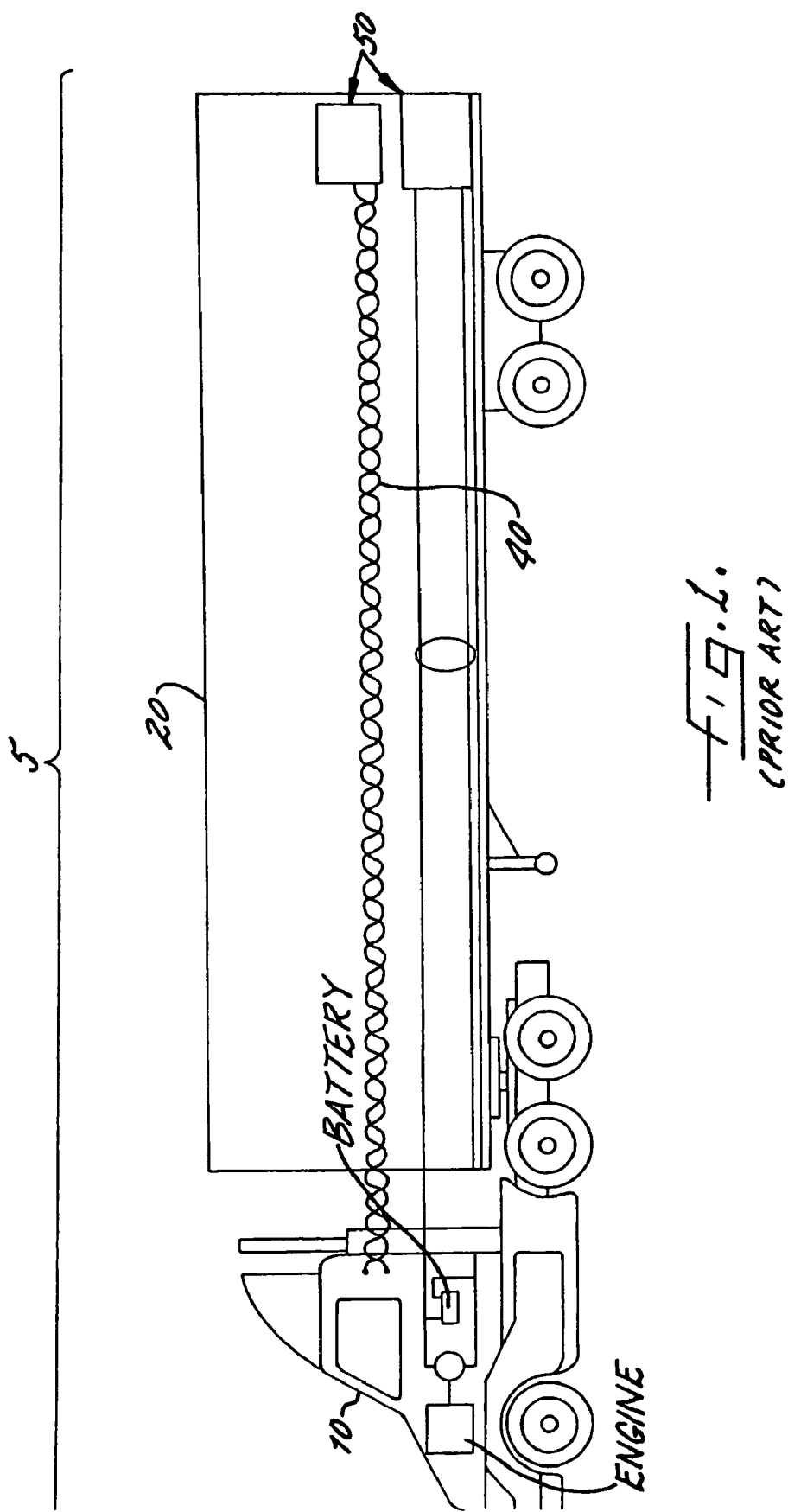
FIG. 1 graphically illustrates a tractor/trailer rig according to the prior art.

FIG. 1 illustrates electrical subsystems of a vehicle, namely a tractor/trailer vehicle or rig 5, which typically include a power bus 30 electrically connected to one or more batteries 32, which are typically charged by an alternator 34 mechanically driven by a tractor engine 15, distributing electrical power from tractor 10 to subsystems throughout the vehicle 5. In addition to the power bus 30, the rig may include a communication bus 40 used to communicate data between various subsystems 50 of the rig. The Society of Automotive Engineers (SAE) has established various standards for communication busses in tractor/trailers. For example, the recommended practice of SAE J1708 defines serial communications for signals in heavy-duty vehicles using a twisted-pair wire driven under electrical parameters similar to IEEE RS-485, along with message formats and reserved addresses for such a system. SAE J1708 is described in the publication "*Surface Vehicle Recommended Practice, Serial Data Communications Between Microcomputer Systems in Heavy Duty Vehicle Applications*," published by the Society of Automotive Engineers, Oct. 5, 1995, the entirety of which is herein incorporated by reference.

Power bus 30 may also serve as a communications bus. For example, a data-modulated carrier signal may be superposed on the power bus 30 by inductive or capacitive coupling. Communications over the power bus 30 may employ spread spectrum techniques such as the spread spectrum technology embodied in integrated circuits and components (i.e., Intellon SSC PLCEFN, XCR38149PRO2, QHCK-9409 integrated circuit or CEBus-compliant communications modules according to EIA RS-232 and ISA bus module standards) of the Intellon Spread Spectrum Carrier of the Intellon Corporation of Ocala, Fla. which are hereby incorporated herein in its entirety by reference. As understood by those skilled in the art, a spectrum (e.g., 100-400 Khz) of frequencies for data communications allows the signal to be communicated in a manner over the power line which significantly reduces the interference or suppression of the received signal by other electro mechanical systems in the tractor/trailer, such as the alternator. In addition to twisted-pair and power line carrier communications techniques, other techniques such as fiber optic or radio frequency (RF) communications techniques may be used.

Figure 2:
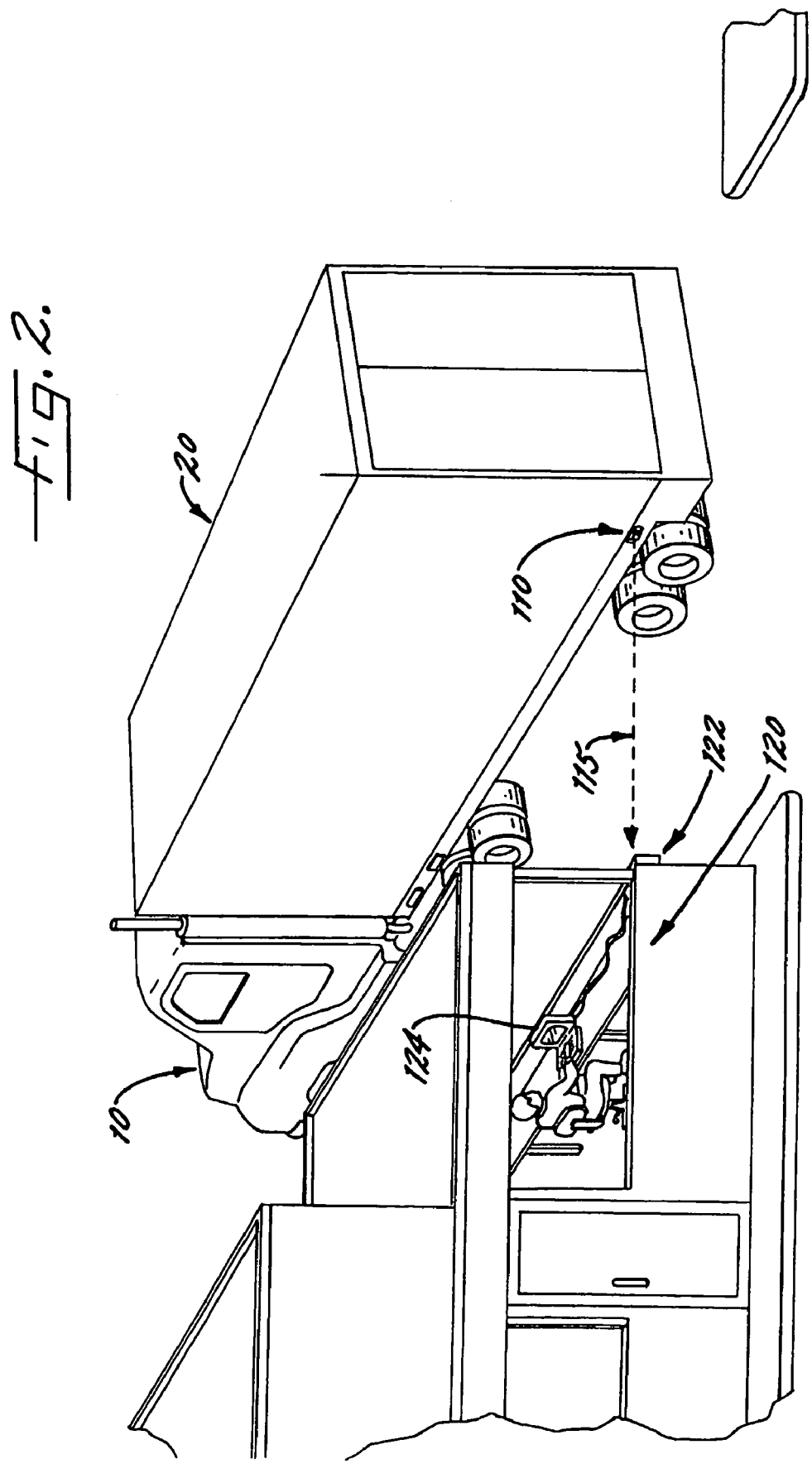
FIG. 2 graphically illustrates an embodiment of a vehicle identification system according to the present invention.

FIG. 2 graphically illustrates an embodiment of a vehicle identification system including a vehicle 5 comprising an ensemble of components 10, 20 and optical wavelength carrier communicating means 110 positioned on the component 20 of the ensemble, here a trailer. Optical wavelength carrier communicating means 110 produces an optical identification signal 115 representing an identity of the vehicle 5. The signal is preferably emitted through a transmitter having a header, vehicle identification data, and a check sum or verifier. Identity determining means 120 is positioned external to the vehicle 5. Identity determining means 120, here shown as including a receiver 122 and a console 124, determines an identity of the vehicle from the data of the optical identification signal 115 as understood by those skilled in the art.

Figure 3:
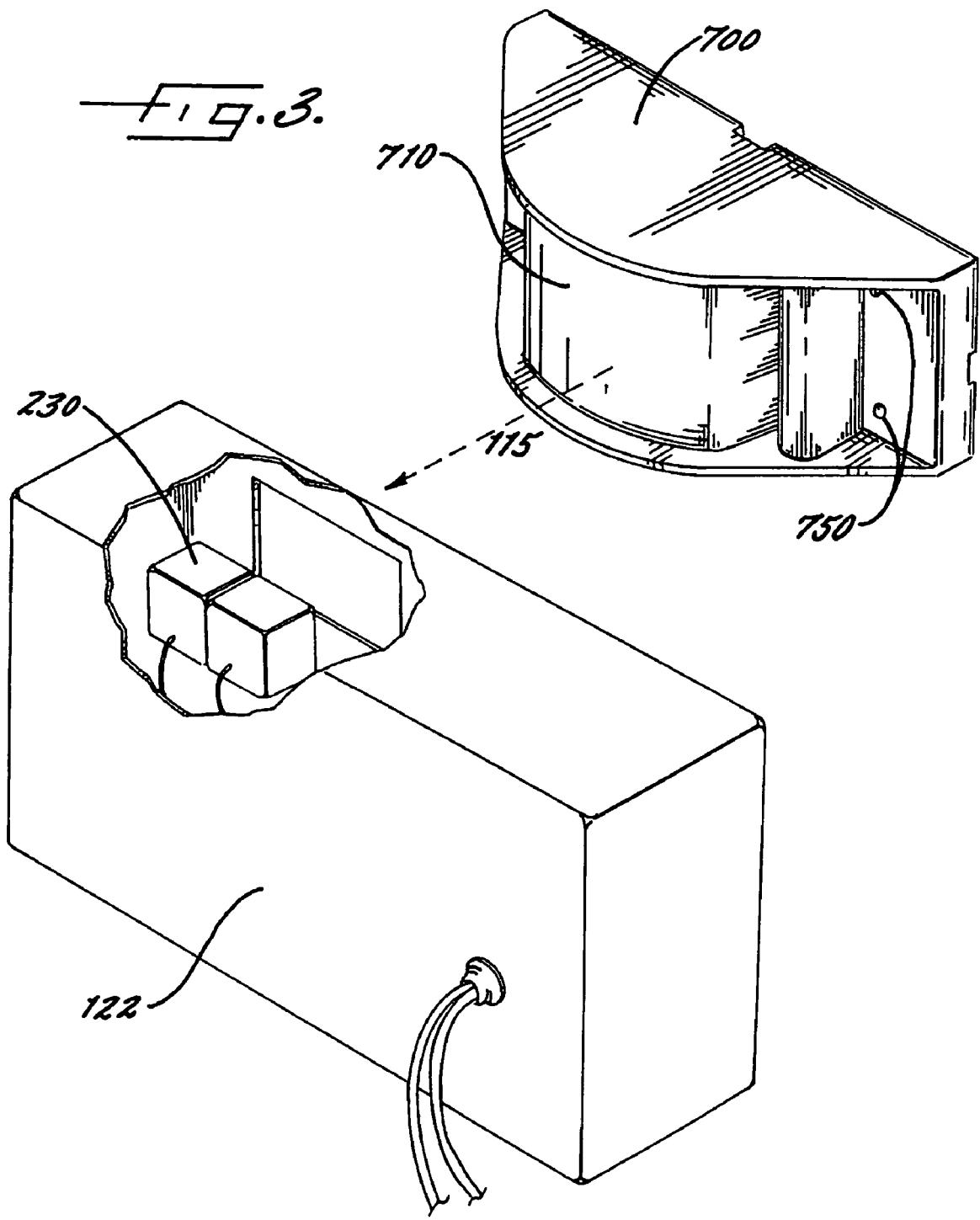
FIG. 3 graphically illustrates relationships between portions of a vehicle identification system according to an embodiment of the present invention.

FIG. 3 illustrates the relationship between optical wavelength carrier communicating means 110 and identity determining means 120 of FIG. 2 in greater detail. Optical wavelength carrier communicating means 110 is illustrated as concealed within an indicator 700 which may be mounted on the vehicle 5 using mounting means 750. The receiver 122 of identity determining means 120 includes optical receiving means 230. Optical receiving means 230 receives the optical identification signal 115 produced by optical wavelength carrier communicating means 110.

Optical identification signal 115 includes a carrier signal having a wavelength in the optical spectrum, a portion of the broader electromagnetic spectrum. The "*IEEE Standard Dictionary of Electrical and Electronic Terms, ANSI/IEEE Std 100-1988, Fourth Edition*," published by the Institute of Electrical and Electronics Engineers, defines the "optical spectrum" as "generally, the electromagnetic spectrum within the wavelength region extending from the vacuum ultraviolet at 40 nanometers (mm)." Those skilled in the art will understand that such definitions are approximate and subject to change, and that "optical" as referred to herein generally also refers to signals having wavelengths in the portion of the electromagnetic spectrum for which communication techniques applicable in the visible spectrum are also applicable, including the use of photoemissive semiconductor materials to produce optical signals, line-of-sight transmission of optical signals through an atmospheric medium, the use of photosensitive semiconductor materials to detect optical signals through an atmospheric medium, the use of photosensitive semiconductor materials to detect optical signals, and the like. The optical spectrum is thus distinct from the radio frequency spectrum which generally includes signals having wavelengths greater than 1 millimeter and which is generally subject to communication regulations in the United States and elsewhere.

As an alternative, and although not preferred, a radio-frequency (RF) identification system could be used according to the present invention whereby a RF transmitter located on the rig sends identifying information to the receiver externally located to the rig, for example, in a weigh station or a cargo terminal control office. Although RF communication techniques may provide increased information capacity and detection range, several considerations may limit their practical applicability to tractor/trailer identification, and therefore such systems are not preferred. For example, RF communication systems generally require FCC approval, with transmitter and receiver design being subject to regulation, and generally such systems would have to compete with other users for an increasingly crowded FR spectrum. Moreover, RF systems can be vulnerable to electromagnetic interference, such as that produced by alternators or other electrical subsystems typically found on rigs. The interference problem may be exacervbated because identification typically is desired in staging areas such as weigh stations and cargo terminals where the presence of large numbers of rigs emitting RF signals may drastically increase interference. Minimizing interference and maintaining signal quality under these conditions may require stringent bandwidth and power limitations which may necessitate costly transmitter and receiver designs.

Figure 4:
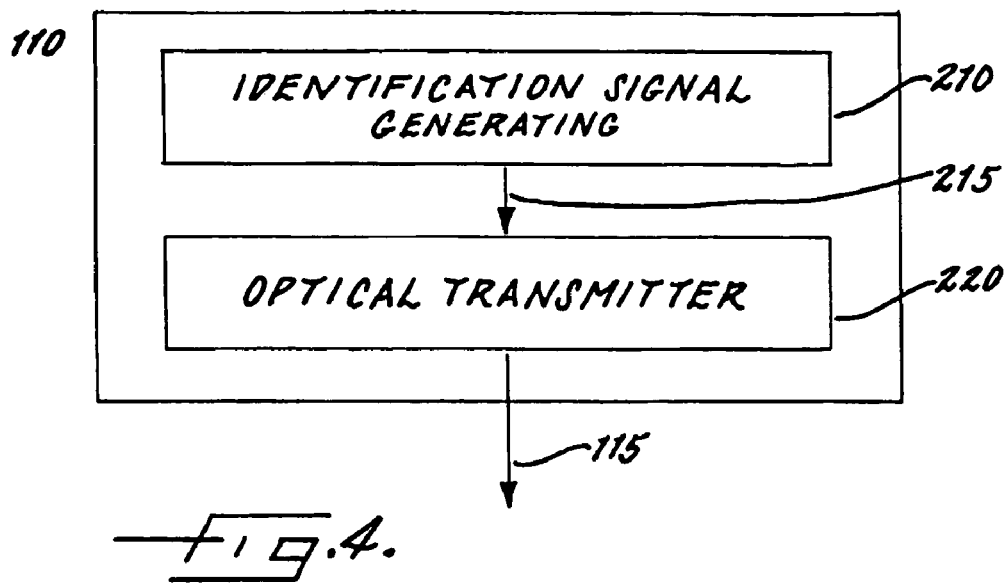
FIG. 4 illustrates operations for producing an optical identification signal according to an embodiment of the present invention.

FIG. 4 illustrates in detail functions of an optical wavelength carrier communicating means 110 according to the present invention. Optical wavelength carrier communicating means 110 includes identification signal generating means 210 for generating an identification signal 215 representing an identity of the vehicle 5. From the generated identification signal 215, an optical transmitter 220 produces an optical identification signal 115 representing an identity of the vehicle 5.

Figure 6:
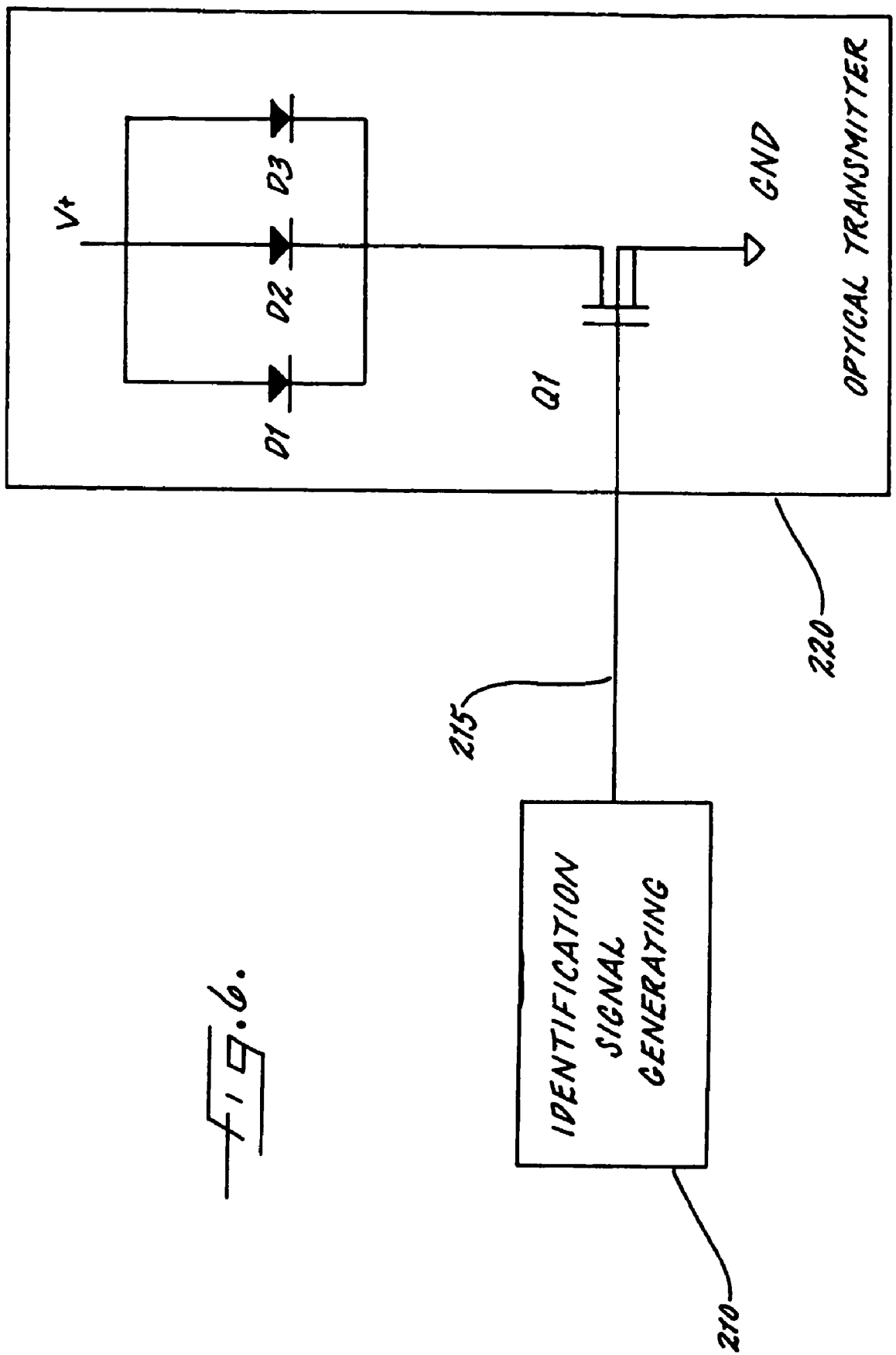
FIG. 6 is a schematic block diagram of an electrical circuit which generates an identification signal and transmits an optical identification signal from the generated identification signal according to an embodiment of the present invention.

FIG. 6 is an electrical schematic diagram of an exemplary embodiment of identification signal generating means 210 and an optical transmitter 220 according to the present invention. Those skilled in the art will understand that the identification generating signal generating means 210 may include derbies capable of producing an analog or digital signal for transmission by the optical transmitter 220, such as a microcontroller, programmable logic device (PLD), oscillator, and the like. Those skilled in the art will also understand that the identification may be generated using other hardware, software running in a general or special purpose computer on the vehicle, by a combination of software and hardware. The identification signal may, for instance, be a serial digital signal having a message format including multiple message structures and the like. Those skilled in the art will also understand that the optical identification signal may be communicated to the optical transmitter 420 using various communications techniques, such as those involving analog or digital transmission over twisted wire pairs, power line carrier, optical fiber, and the like.

The optical transmitter 220 is shown including a modulating transistor Q1 which modulates an array of optical emitting diodes D1-D3 is an infrared emitting diode producing an optical frequency carrier signal in the range of 700-1400 nanometers, i.e., the near infrared portion of the electromagnetic spectrum, similar to the inexpensive type of optical-emitting diode commonly used in smoke detectors. An example of such an optical-emitting diode is the LTE 4228U high-intensity Gallium Aluminum Arsenide optical emitting diode sold by Liteon, Inc. and as described in Liteon catalogs as understood by those skilled in the art, the specification of which is hereby incorporated by reference. Those skilled in the art will understand that any number of diodes such as the diodes D1-D3 illustrated may be used with the present invention, with the number depending on the amount of transmitted energy desired.

Those skilled in the art will understand that in the wavelength band from 700 to 1400 nanometers, water exhibits increased transmissivity and thus optical radiation emitted in this portion of the spectrum is less subject to attenuation under the conditions of fog, mist, and rain which are often encountered in tractor/trailer operations. Those skilled in the art will also understand that other types of optical emitters may be utilized with the present invention. Emitters with peak intensity in other "windows" of the optical spectrum may be used with the present invention, for example, diodes which emit carrier frequencies in the infrared atmospheric transmission bands at 3-5 micrometers and 8-12 micrometers wavelength. Those skilled in the art will also understand that although infrared emitting diodes such as those illustrated typically emit non-coherent bands of carrier signals concentrated within a portion of the infrared region of the electromagnetic spectrum, non-coherent emitters with differing spectral distributions and coherent emitters such as lasers and diodes may also be used with the present invention.

Figure 7:
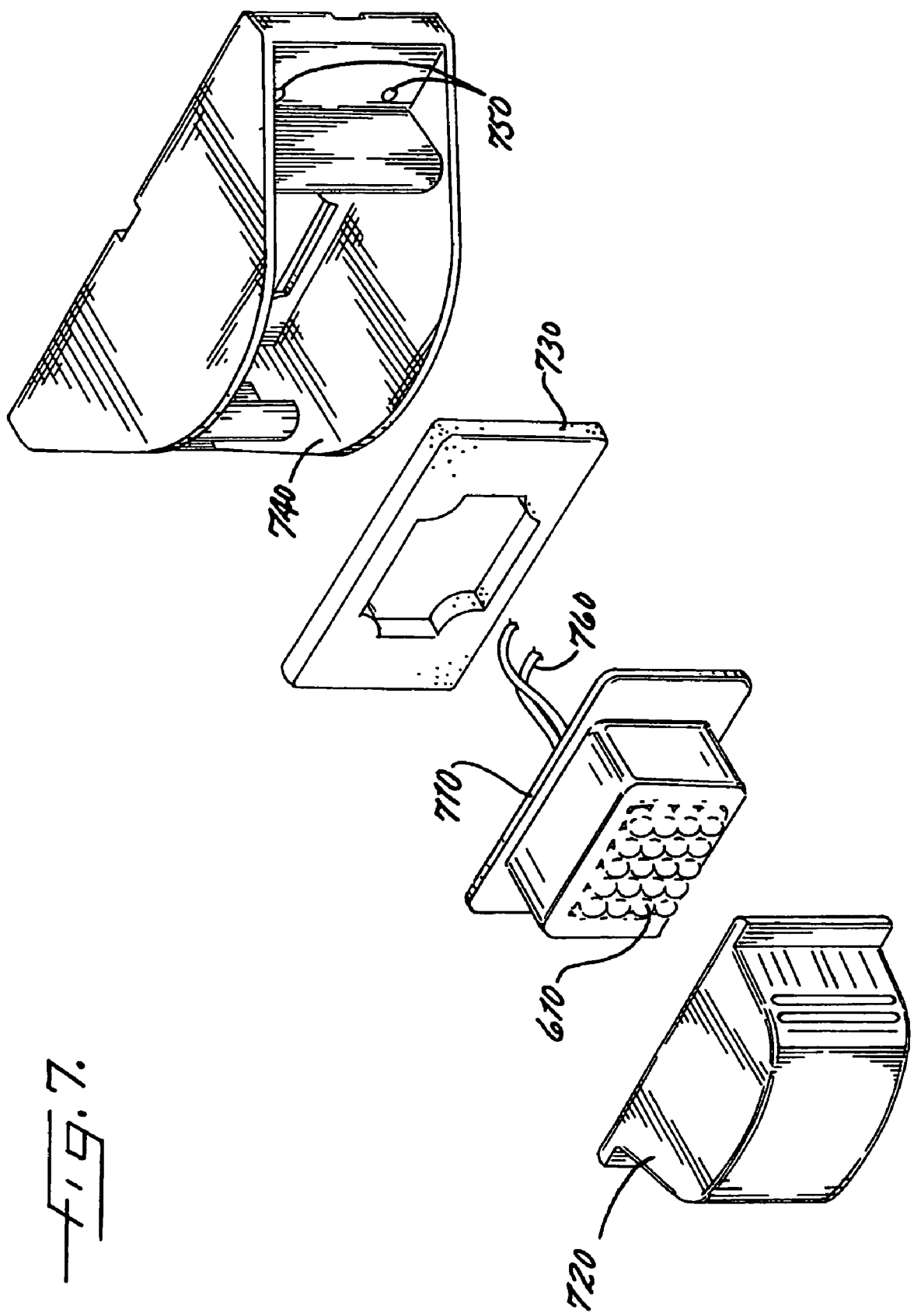
FIG. 7 is an exploded view of a standard form factor indicator embodiment of the present invention.

FIG. 7 illustrates an embodiment of an indicator 700, including an indicator housing 701 having a standard truck light or track indicator form factor (e.g., a lamp or marker), which preferably is used to conceal portions of optical wavelength carrier communication means 110, including the optical transmitter 200, thus rendering the identification system less conspicuous on the exterior of a vehicle. This concealment also reduces attention being drawn to the transmitter so that theft of and damage to the transmitter are reduced. The indicator housing 701 retains the optical transmitter 220 within the indicator 700. The indicator housing 701 retains the optical transmitter 220 within the indicator 700. The indicator housing 701 is here illustrated as including a sealed electronics package 710 which holds the optical transmitter 200, a transparent lens 720, and mounting base 740 which enclose the sealed electronics package 710 from dirt and vibration. The indicator 700 includes means 750 for mounting the indicator 700 on a vehicle, here shown as holes for screws or bolts. Those skilled in the art will understand that the present invention may be used with a variety of other packaging arrangements which similarly conceal the optical wavelength carrier communicating means, preferably within a running light, clearance light, or other standardized form factor indicator commonly employed on the exterior of tractor/trailer rigs.

The indicator may include wires, terminals, or other features for providing electrical power and other signals to the optical wavelength carrier communicating means 110. For example, indicator 700 may include means 760 for electrically connecting optical transmitter 220 to a power bus, such as the power bus 30 illustrated in FIG. 1, such that electrical power and an identification signal 215 communicated over the bus may be conveyed to the optical transmitter 220.

The indicator housing 700 may retain both the identification signal generating means 210 and the optical transmitter 220 of the optical wavelength communicating means 110 of FIG. 4, or retain only the optical transmitter 200. For the first "Standalone ID Tag" embodiment, a tag is created which may be used to identify the vehicle or component upon which it is mounted providing an easy and inexpensive retrofit for existing equipment. For example, an existing running or clearance light may be replaced by an indicator 700 having a similar form factor and which retains optical wavelength communicating means 110 and uses existing power connections.

Figure 5:
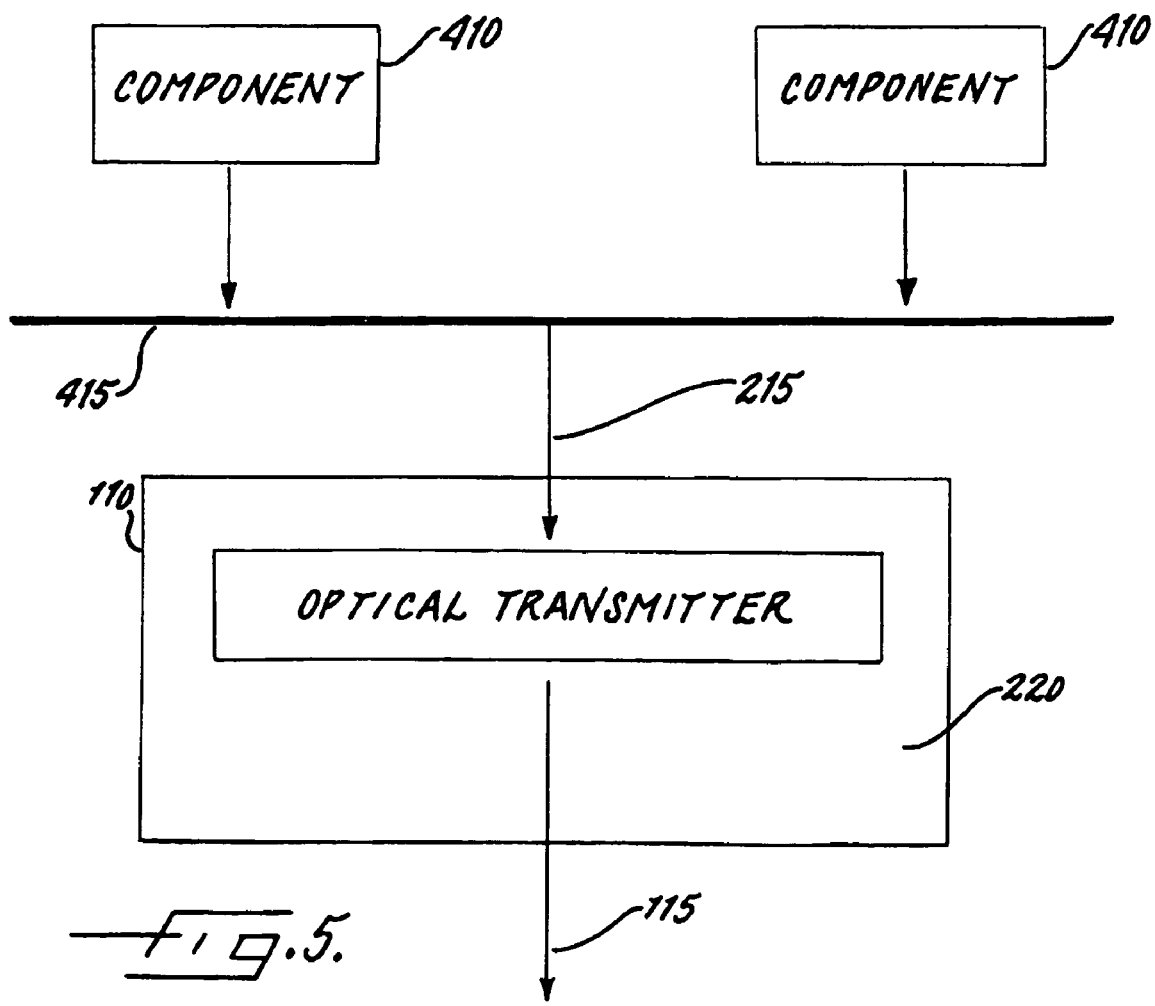
FIG. 5 is a "Networked ID Tag" embodiment of the present invention.

For the second "Networked ID Tag" embodiment, as illustrated in the block diagram of FIG. 5, identification signal generating means 210 may be located within a component 410 of the vehicle, external to the indicator 700, and the identification signal 215 retained within the indicator 700 via a communications bus 415 such as an SAE U1708 bus, power bus, fiber optic bus, and the like. In this manner, a single optical transmitter 220 may produce multiple optical identification signals 115 from identification signals 215 generated by multiple identification signal generating means 215 located on different components 410.

FIG. 8 illustrates in greater detail identity determining means 120 for determining an identity of a tractor/trailer from an optical identification signal such as produced by the optical wavelength carrier communicating means 110 of FIGS. 2-7. Identity determining means 120 may include optical receiving means 230 for receiving the optical identification signal 115 produced by optical signal converting means 250 decodes an identity 125 of the vehicle 5 from the converted identification signal 245 wavelength communicating means 110 and uses existing power connections.

FIG. 9 illustrates an exemplary embodiment of optical receiving means 230 and optical signal converting means 240. Optical receiving means 230 may include an infrared detector, preferably a detector exhibiting maximum sensitivity in the near infrared portion of the electromagnetic spectrum, in the region from approximately 700 nanometers to 1400 nanometers, approximately corresponding to the spectra of the infrared-emitting diodes discussed above. An example of such a detector is the LTM-8834-7 photodetector sold by Liteon, Inc., as described in Liteon catalogs as understood by those skilled in the art, the specification of which is hereby incorporated by reference.

Those skilled in the art will understand that many different types of optical detectors may be employed with the present invention. For example, the optical receiving means 230 may include photodiodes or phototransistors which exhibit peak sensitivities in other "windows" in the optical region of the electromagnetic spectrum. The optical receiving means 230 may also include various reticles, lenses, mirrors, filters, and the like which may modify the sensitivity, selectivity, and other parameters of receiving means 230.

Also illustrated in FIG. 9, the optical signal converting means 240 of FIG. 8 may include, for example, a microcontroller which converts the received optical identification signal 235 into converted identification signal 245 for use by the identification signal decoding means 250 of FIG. 8. For example, the optical receiving means 230 may receive an optical identification signal 115 having a specified serial data format, and the received optical identification signal 235 may include a digital signal having the same serial format. The optical signal converting means 240 may convert the serial data signal into, for example, a standardized RS-232 data signal for input into a computer interface.

The decoding means 250 of FIG. 8 preferably includes communications interface software running on a personal computer or similar computing platform which interprets a data stream received from optical signal converting means 240, extracting identity information relating to the tractor/trailer. Such interface software is well-known to those skilled in the art and will not be discussed in detail herein. An example of such interface software is the Windows-based Software Wedge, marketed by T.A.L. Enterprises of Philadelphia, Pa., which can transfer serial data to Windows. For example Software Wedge may be used to port the converted identification signal 245 to a spreadsheet program such as Microsoft's Excel, as part of a freight management system. The Software Wedge is described further in the "*Software Wedge*" for Windows software manual (e.g., Version 3.0 Professional Edition) which is hereby incorporated herein by reference and marketed by T.A.L. Enterprises of Philadelphia, Pa.

Figure 10:
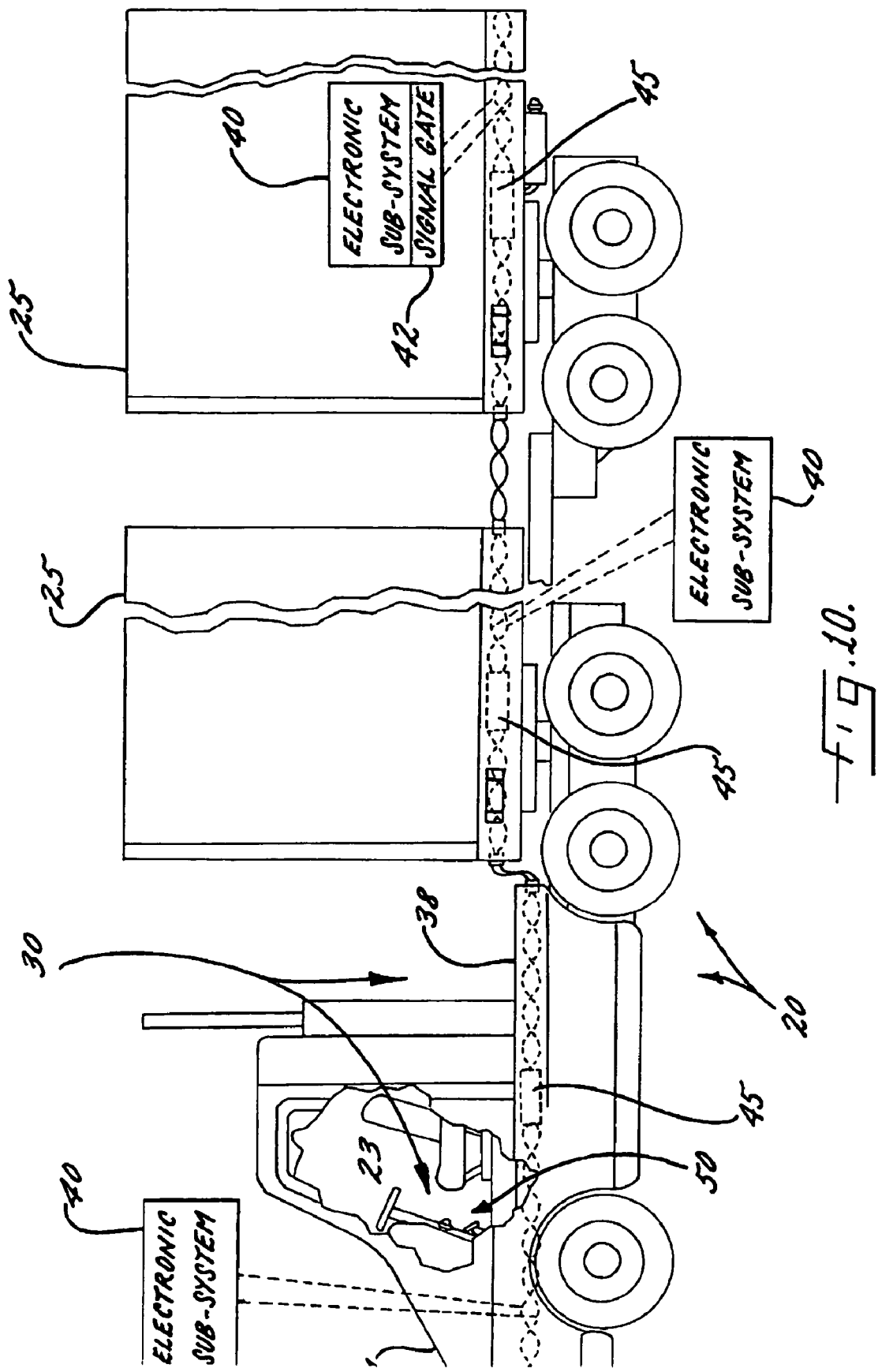
FIG. 10 is a side elevational view of a vehicle in an embodiment as a tractor/trailer truck in combination with an apparatus for data communications between the truck and a remote data communication terminal according to the present invention.
Figure 11:
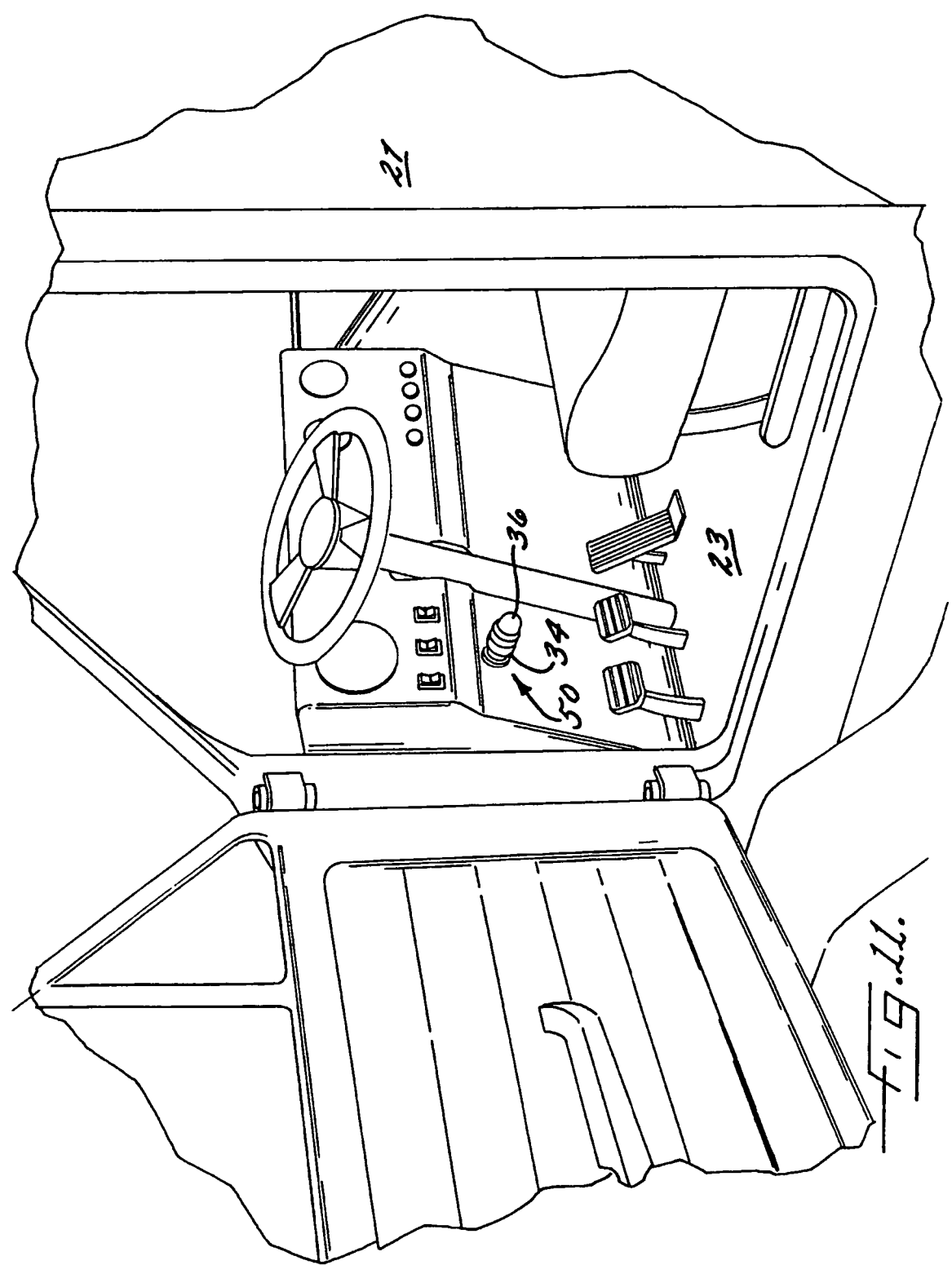
FIG. 11 is a perspective view of an apparatus for data communications between a vehicle and a remote data communications terminal having a transceiver positioned in a cab of a tractor of a tractor/trailer truck according to a first embodiment of the present invention.
Figure 12:
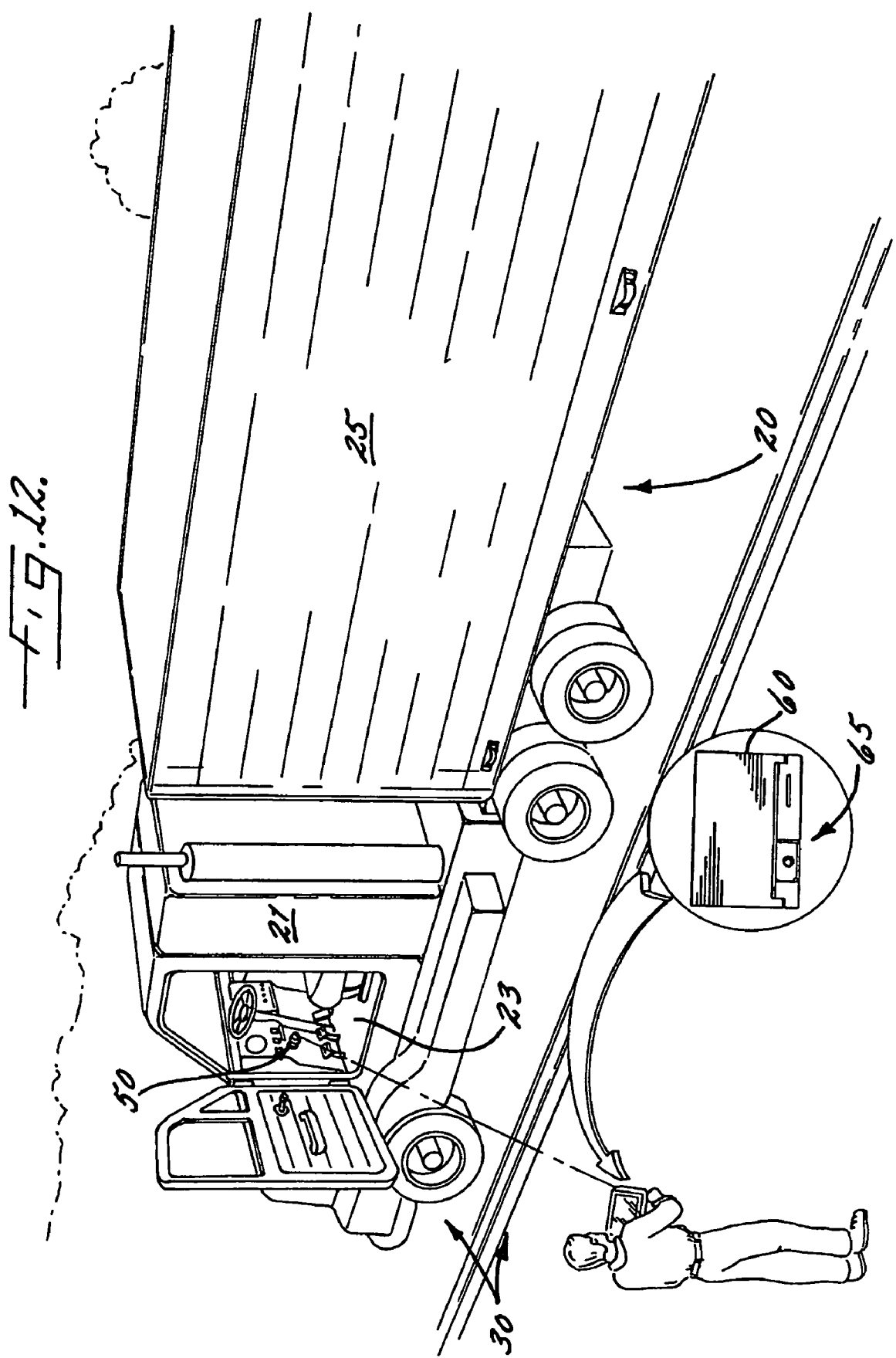
FIG. 12 is a perspective view of an apparatus for data communications between a vehicle and a remote data communications terminal having a transceiver positioned in a cab of a tractor of a tractor/trailer truck and a remote data communications terminal positioned in the hands of a driver according to a first embodiment of the present invention.

FIGS. 10-12 illustrate an apparatus 30 for data communications associated with a heavy duty vehicle 20, namely a tractor/trailer combination or tractor/trailer truck, according to a first embodiment of the present invention. As understood by those skilled in the art, the tractor/trailer combination preferably includes a tractor 21 connected to a trailer 25 for pulling the trailer 25. The tractor 21 and trailer 25 include respective frames and coupling means for coupling the trailer 25 to the tractor 21. In addition, the tractor 21 includes an engine, such as a diesel engine or other motor, for moving the tractor 21 to thereby pull the trailer 25. It will also be understood by those skilled in the art that other types of heavy duty vehicles, such as a recreational vehicle, agricultural tractors or other heavy duty vehicles used in association with agricultural uses, can also be used according to the present invention.

The data communications apparatus 30 preferably includes at least one electronic subsystem 40 associated with the heavy duty vehicle 20. The at least one electronic subsystem 40, for example, can include an anti-locking brake system ("ABS") 41 connected to the heavy duty vehicle 20. The tractor/trailer combination, however, preferably includes a plurality of electronic subsystems associated with tractor 21 and/or trailer 25. The electronic subsystems 40 preferably produce data or includes some type of signal generating means, e.g., preferably provided by a signal generator 42. Some examples of these electronic subsystems 40 and features which may be controlled and/or monitored by the apparatus of the present invention are illustrated for a tractor/trailer combination in Table I and for an agricultural tractor in Table II below:

TABLE I

| TRACTOR | TRAILER |
|---|---|
| Mirror Tracking | Reefer Temperatures |
| Mirror with Trailer Display | Reefer Pressures |
| Controls for Reefer (Engine) | Trailer Identification |
| Controls for Trailer Slide | Blind Spot Warning |
| Axle | Cargo Information |
| Controls for Landing Gear | Smoke/Fire Detection |
| Active Faring | Overall (Tanker) |
| Recorder for Trailer Functions | Cargo Shift |
| Satellite for Trailer Functions | Weight Detection |
| Brake System Information | Anti Lock Failure |
| Brake By Wire | Brake By Wire |
| Climate Controls for Reefer | Backup Lamps |
| | Suspension Control |
| | Sliding Axle Control |
| | Liftable Tailgate |
| | Time Pressure Monitor |
| | Lamp Outage Monitor |
| | Stop Lamp Saver (with doubles and triples) |
| | Water in Air Reservoir |
| | Liftable Landing Gear |
| | Brake Temperature |
| Mirror with Trailer Display | Emergency Line Pressure Detection |
| Trailer Identification | |
| Trailer Brake Temperature | Blind Spot Warning |
| Trailer Axle Temperatures | Cargo Information |
| Trailer Security | Time Pressure Warning |
| Weight Broadcast | Smoke Detector |
| Trailer Voltage Status | Roll Over Protection |
| | Active Conspicuity (Lighting) |
| | Active Tire Pressure |
| | Backup Alarm |
| | Inventory Data Collection |
| | Security Warning |
| | Trailer Engine Start |
| | Trailer Engine Monitor |
| | Tractor/Changing from Reefer |
| | Trailer Dome Lamps |
| | Rear Door Lift (Motorized) |

TABLE II

| TRACTOR | IMPLEMENT |
|---|---|
| Vehicle Spped Optimization | Sprayer Pressure |
| Engine Speed Optimization | Speed Planning Rates |
| Implement Display | Depth Position |
| GPS (Satellite Control to Implement) | Hydraulic Controls |
| | Speed Counting |
| | Moisture Sensing |

The data communications apparatus 30 also preferably includes a plurality of electrical conductors 38, e.g., preferably provided by twisted pair wiring as understood by those skilled in the art, which are preferably connected to the plurality of electronic subsystems 40 and associated with the heavy duty vehicle 20. The plurality of electrical conductors 38 preferably provide one or more data communications channels or paths for data communications with the electronic subsystems 40, as well as a controller 45 as described further below herein.

As perhaps best illustrated in FIGS. 15 and 20, the data communications apparatus 30 preferably also has vehicle data communications protocol converting means 33, 33', e.g., preferably provided by a vehicle data communications protocol converter as illustrated by first and second data communications protocol converters 37, 39, 37', 39' and a first signal booster 36, 36', connected to the plurality of electrical conductors 38, 38' for converting a first data communications protocol associated with data communications along the plurality of electrical conductors 38, 38' to a second data communications protocol. As understood by those skilled in the art, the first data communications protocol is preferably according to SAE J1708, but also could be according to SAE J1939 or RS-485. In other words, the first data communications protocol is preferably an existing data communications protocol conventionally associated with the tractor/trailer combination or the heavy duty vehicle 20. The first data communications protocol converter 37 is preferably an RS-485 transceiver, as understood by those skilled in the art, which transmits and receives data communications according to the J1708 protocol to the plurality of conductors 38 and transmits and receives data communications according to the RS-485 protocol to the second data communications protocol converter 39 and vice-versa.

Additionally, the vehicle data communications protocol converting means 33 can convert the first data communications protocol, e.g., SAE J1708, into a third data communications protocol, e.g., RS-485, and then convert the third data communications protocol, e.g., RS-485, into yet the second data communications protocol, e.g., IrDa or other infrared or RF data communications protocol, which is used to transmit data through-the-air to a remote data communications terminal 60, 60' (see FIGS. 14 and 20). The second data communications protocol converter 39 preferably is a combination of a microprocessor or other microcontroller connected to the RS-485 transceiver which transmits and receives logic level signals and an infrared IrDA compliant integrated circuit, such as provided by Hewlett Packard or Rohm as understood by those skilled in the art, connected to the microprocessor which transmits and receives the logic level signals.

When transmitting from the vehicle 20, the IrDA compliant integrated circuit receives logic levels from the microcontroller and converts the logic levels to IrDA data communications protocol based upon timed infrared pulse signals of a predetermined position, pulse widths, and/or duration depending on the desired baud or bit rate of data communications. The IrDA integrated circuit also receives an infrared data communications protocol and transmits logic levels when receiving data communications from a remote data communications terminal 60. The IrDA integrated circuit can include a built-in infrared transceiver 35, e.g., an infrared light emitting diode and an infrared photodetector or photodiode. At least the infrared light emitter or light emitting diode, however, is preferably not built into the IrDA integrated circuit because the vehicle data communications protocol converting means 33 also preferably includes the first signal booster 36.

The second data communications protocol is preferably one of either an infrared data communications protocol or an RF data communications protocol. In other words, the second data communications protocol is preferably a through-the-air type of data communications protocol which does not require equipment to be coupled to the heavy duty vehicle 20 when obtaining data therefrom or monitoring vehicle operational conditions. If the data communications is according to an RF data communications protocol as illustrated in FIG. 11, then the second data communication protocol converter 39' preferably includes an RF data communications integrated circuit or analog circuit as understood by those skilled in the art which receives and transmits logic levels to a microprocessor or microcontroller and transmits and receives RF data communications according to predetermined RF data communications protocol, e.g., a simple modulation scheme or a more complex protocol such as CEBus as understood by those skilled in the art.

Additionally, particularly on the transmit portion of the vehicle data communications converting means 33, the converting means 33 also preferably includes a signal booster 36, e.g., preferably provided by amplification circuitry and/or power boosting circuitry, which advantageously boosts the transmit signal to thereby increase the successful transmit range of the associated transmit portion of the transceiver 35.

An infrared data communications protocol, such as IrDA as understood by those skilled in the art, can be particularly advantageous in association with heavy duty vehicles for numerous reasons. For example, dirt, dust, grime, corrosive atmospheres, vibration, rough handling, or other obstacles can often be readily overcome with appropriate design of the driving and receiving electronics. Also, infrared data communications is immune from electro-magnetic interference ("EMI") which, as understood by those skilled in the art, can impact other types of data communications media. Further, infrared data communications would not interfere with other type of through-the-air data communications channels such as RF data communications.

As illustrated in FIGS. 10-11 and 13, a connector 50 is preferably connected to the plurality of electrical conductors 38. The connector 50 can also be connected to one or more of the electronic subsystems 40, e.g., an ABS system, preferably through the electrical conductors 38. For example, the connector 50 can be a six-pin Deutch connector or other well known connector associated with trucks or other heavy duty vehicles (see FIG. 4). The connector 50, in a first embodiment, also can be advantageously positioned in the cab 23 of the tractor 21 of the truck (see FIGS. 11-12). This location, for example, is a secure position for a transceiver 35, as described further below herein, because the cab 23 can be locked and a security alarm system or other security system can be associated with the cab 23. Additionally, the cab 23 provides a convenient position for the driver, government officials, or others involved in the related industry to provide access to operational conditions of the vehicle 20. This further takes advantage of existing positions of vehicle connectors to tap into or access the plurality of electrical conductors 38 which provide data or information to the cab of the tractor without requiring extensive rewiring, retrofitting, or adding expensive equipment to the vehicle 20.

As perhaps best illustrated in FIGS. 17-19, in a second embodiment of the connector 50', for example, the connector 50' can be positioned more closely in association with one of the electronic subsystems 40 such as the ABS system of the trailer 25 of the truck. The second embodiment also illustrates a connector 50' known to those in the heavy duty vehicle art, and namely the trucking industry. This connector 50', however, is advantageously modified by adding a transceiver housing 34 and a transceiver 35 as described further below herein. In each of the first and second embodiments, the connector 50, 50' preferably includes a plurality of pins 55 having a predetermined pin configuration. The connector 50, 50' also preferably has one of either a generally cylindrical or a generally rectangular shape.

The connector 50, 50' also preferably has first and second mating connector portions 51, 52, 51', 52' which are joined together by a frictional fit so that the plurality of pins 55 are matingly received into a corresponding plurality of contact elements 56. As understood by those skilled in the art, the connector 50, 50' can also have some type of connector aligning means associated therewith for readily aligning the first and second mating connector portions 51, 52, 51', 52'.

A transceiver housing 34 is preferably detachably connected to the connector 50, 50'. The transceiver housing 34, 34' also preferably includes a translucent cover member 31 for transmitting the second data communications protocol therethrough. In a first embodiment of the transceiver housing 34, the transceiver housing 34 can either include the second mating connector portion 52 being formed as a portion of or integrally as a single piece therewith, or the second mating connector portion 52 can define the transceiver housing 34. The transceiver housing 34 in this embodiment likewise preferably has one of either a cylindrical or a rectangular shape. The transceiver housing 34 preferably includes or has integrally formed as one piece therewith an optically translucent cover member 31 for transmitting and receiving infrared or RF data communications therethrough to the remote data communications terminal 60. Advantageously, because the transceiver housing 34 forms a portion of or readily attaches to a standard vehicle connector, e.g., the first mating connector portion 51, the data communications apparatus 30 is readily adapted to existing heavy duty vehicle data communication technology and does not require either extensive retrofitting or extensive and expensive additions to existing heavy duty vehicle data communication technology.

As perhaps best illustrated in FIGS. 15-16, in a second embodiment of the transceiver housing 34', the transceiver housing 34' can advantageously be a vehicle light housing mounted to the heavy duty vehicle 20 for housing a vehicle light. The vehicle light housing, for example, can advantageously be a side-marker light housing mounted to the trailer 25 of a truck so that a third party would not readily recognize that the truck is equipped with the data communications apparatus 30.

A transceiver 35 is preferably positioned within the transceiver housing 34, 34' and connected to the vehicle data communications protocol converting means 33 for transmitting the second data communications protocol from the heavy duty vehicle 20 and receiving the data communications protocol from a remote data communications terminal 60. For infrared data communications, for example, the transceiver 35 (see also FIG. 13) preferably includes a plurality of infrared light emitter or light emitting diodes, a plurality of infrared photodiodes, and associated drive and amplification circuitry as understood by those skilled in the art.

As also understood by those skilled in the art, the transceiver 35 is preferably only a physical layer signal processing transceiver, e.g., infrared or radio frequency, and preferably includes a combination transmitter and receiver which collects data or information from the various subsystems and communicates the data to one or more remote data communications terminals 60. The transceiver 35 is preferably a first transceiver 35, and the one or more remote data communication terminals 60 preferably each include a second transceiver 65, 65' for transmitting the second data communications protocol to the first transceiver 35 and receiving the second data communications protocol from the first transceiver 35. The second transceiver 65, 65' is preferably similar to the first transceiver 35 as described herein above and accordingly for brevity will not be repeated herein.

The first and second transceivers 35, 35', 65, 65' also each include a signal processing physical layer. Advantageously, the second data communications protocol only uses the physical layer of the first and second transceivers 35, 65 for signal processing and not a data link layer ("DLL") as understood by those skilled in the art. By only using the physical layer for signal processing, the data communications and coding or modulation schemes for the communications is greatly simplified and the data conversion from one data communications protocol to another data communications protocol is also simplified.

The remote data communications terminal 60 is preferably a computer, e.g., provided by a portable laptop or handheld computer, or other portable or substantially stationary remote data collection stations as understood by those skilled in the art. The remote data communications terminal 60 also includes remote data communications protocol converting means 63, e.g., preferably provided by a remote data communication protocol converter as illustrated by the third data communications protocol converter 69 and the second signal booster 66, for converting the second data communications protocol received by the remote data communications terminal to a third data communications protocol associated with the computer. The third data communications protocol, for example, can be RS-232, RS-422, RS-423 or other data communications protocol, as understood by those skilled in the art. If two conversions occur in the vehicle data converter 33, e.g., RS-485 to RS-232 and RS-232 to IrDA or RF, then the third data communications protocol would actually be yet a fourth data communications protocol as sequentially illustrated in FIGS. 14 and 19. The remote data communications protocol converting means 63, e.g., a remote data communications protocol converter, also preferably includes data signal boosting means, e.g., a second signal booster 66 similar to the first signal booster 36 as described above herein, for boosting the range of the signal between the remote data communications terminal 60 and the first transceiver 35 of the data communications apparatus 30 to thereby increase the effective range of transmission for which the apparatus 30 is anticipated to be used. The remote data communications terminal also preferably includes a predetermined data communications protocol transceiver 61, 61', e.g., preferably provided by an RS-232 transceiver as understood by those skilled in the art, as a data communications interface to the personal computer 68 or other data terminal.

The data communications apparatus 30 according to the present invention preferably also includes at least one controller 45 connected to the at least one electronic subsystem 40 and the plurality of electrical connectors 38 for controlling data communications along the plurality of electrical conductors 38, e.g., to and from the electronic subsystem(s) 40. As understood by those skilled in the art, the controller 45 preferably includes a microprocessor or microcomputer operating under stored program control to perform various functions related to the monitoring and control of various electronic subsystems on either or both of the tractor 21 and trailer 25 or to the remote data communications terminals 60.

As set forth previously above, each electronic subsystem 40 to be controlled and/or monitored preferably includes signal generating means, e.g., preferably provided by a signal generator, connected to the controller 45 for generating a signal related to the operation of the vehicle 20. The controller 45, for example, produces or outputs a number of digital or analog output controls in the form of relay contact closures or other signals to either the subsystems or to the transceiver 35. The controller 45, for example, can also be an ABS controller which actuates control valves on the trailer 25 to control the brake chambers of the brakes associated with the trailer 25.

As illustrated in FIGS. 10-20, the present invention also includes methods of data communications associated with a heavy duty vehicle 20. The method preferably includes providing a plurality of electrical conductors 38 associated with a heavy duty vehicle 20 and converting a first vehicle data communications protocol associated with data communications along the plurality of electrical conductors 38 to a second data communications protocol. The method also includes transmitting the second data communications protocol from the heavy duty vehicle 20 to a remote data communications terminal 60. The first data communications protocol is preferably either SAE J1708 or SAE J1939. The second data communications protocol, on the other hand, is preferably one of either an infrared data communications protocol or an RF data communications protocol.

The method can also include receiving the second data communications protocol from the remote data communications terminal 60, controlling data communications along the plurality of electrical conductors 38, and generating a signal related to the operation of the vehicle 20. For example, the remote data communications terminal 60 can be a computer, and the method can include remotely converting the second data communications protocol received by the remote data communications terminal 60 to a third data communications protocol associated with the computer.

The method additionally can include positioning a connector 50 so as to be connected in series with the plurality of electrical conductors 38, positioning a transceiver 35 in association with the connector 50, detachably connecting a transceiver housing 34 to the connector 50, and positioning the transceiver 35 within the transceiver housing 34. The transceiver housing 34 preferably includes a translucent cover member 31 for transmitting and receiving the second data communications protocol therethrough.

The method can still further include providing at least one electronic subsystem 40 associated with the heavy duty vehicle 20 and connected to the plurality of electrical conductors 38 related to operation of the heavy duty vehicle 20. The transceiver 35 is preferably a first transceiver, and the remote data communication terminal 60 includes a second transceiver 65. The method also includes transmitting the second data communications protocol to the first transceiver 35 and receiving the second data communications protocol from the first transceiver 35. The first and second transceivers 35, 65 each preferably include a physical layer, and the method further includes transmitting and receiving the second data communications protocol only using the physical layer of the first and second transceivers 35, 65.

As detailed below, the present invention provides apparatus, methods, and computer program products for validating data transmitted to and from the data bus of a vehicle and apparatus and methods for each establishing data communication links with vehicles. Importantly, the present invention provides apparatus, methods, and computer program products that analyze data transmitted to and from the data bus of a vehicle in a bit by bit format and isolate the data bus and remote interrogation device from the receipt of false data. By analyzing the data in a bit by bit format and isolating the data bus and interrogation device from false data, the present invention can be used to replace conventional direct connection systems without requiring significant cost to reconFIG. existing diagnostic and data collection software of existing and newly designed interrogation devices.

Additionally, the present invention provides apparatus and methods for establishing a data communication link between a remote interrogation device and the data bus of a vehicle. In one embodiment, the present invention provides a switch that isolates the data bus of the vehicle from the receipt of signal noise from a transceiver when the data bus is not receiving data from a remote interrogation device. In another embodiment, the present invention provides data link commands from a remote interrogation device attempting to establish a data communication link with the data bus of the vehicle. In this embodiment, when the vehicle receives the data link command, the present invention connects the data bus to a transceiver such that a data communication link can be made between the data bus and the remote interrogation device. In a further embodiment, the present invention provides a periodic heartbeat or signature data signal indicating an established data link between the remote processor and the data bus. In this embodiment, if the vehicle ceases receiving the signature data signal, the vehicle determines that the data communication link has ended and will isolate the data bus from the transceiver. Further, the present invention provides embodiments, the allow a remote interrogation device to a establish a data communication with one vehicle, when other vehicles are located in the transmission and reception range of the interrogation device. The present invention also includes embodiments that can restrict a vehicle that is on the fringe of the transmission and reception range of an interrogation device from attempting to establish a data communication link with the interrogation device.

By processing data with minimal delay, isolating both the data bus and the remote interrogation from receipt of false data, isolating the data bus from external noise when the data bus is not communicating with the remote interrogation device, and providing information concerning the initiation and status of a data communication link, the present invention provides a system that is more easily implemented in existing and future interrogation devices. Further, the present invention provides a system that minimizes the introduction of noise into the data bus of vehicles and provides a practical system of data communication.

Due to the limitations of direct physical connection with a vehicle as described above, however, there may also be a desire to retrofit these existing systems with front end wireless communication add-on systems such that the existing interrogation devices may be remotely located away from the vehicle. For instance, by the present invention, many of these systems can now be retrofitted with RF based communication systems that communicate with the vehicle remotely. Although a conventional systems may attempt to provide wireless communication, the retrofit of an existing interrogation device may be costly.

Specifically, because these retrofitted systems communicate with the vehicle remotely, instead of a direct electrical connection, there is some delay due to processing of the data and transmission of the data. Because of these delays, most of these systems can no longer provide a real-time data link with the data bus of the vehicle. Instead, a conventional attempt to retrofit may use data buffers that buffer data transmitted to and data received from the data bus of the vehicle. The buffered data is held until the data bus has an idle state, at which time the data is applied to the data bus. This buffering of data presents a problem, however, with retrofitting existing interrogation devices.

Specifically, most of the interrogation systems, prior to retrofit, have computer software designed for real-time communication with the data bus. As such, as part of the retrofit process, the original software for operating the interrogation system must be updated or otherwise reprogrammed to accommodate for the delay due to buffering of data. The reprogramming or updating of these programs can be costly. For instance, third party contractors, who may no longer be available for updating the software, may have created many of the programs. Further, the software may have been written using older software programming languages. In some instances, the software may have to be totally reprogrammed. As such, solutions are needed that allow for remote, wireless communication with the data bus of vehicles that is either real-time or approximately real-time, such that the software of the interrogation device and the data bus communicate in approximate real-time and the software of the interrogation device does not have to be altered.

Figure 21:
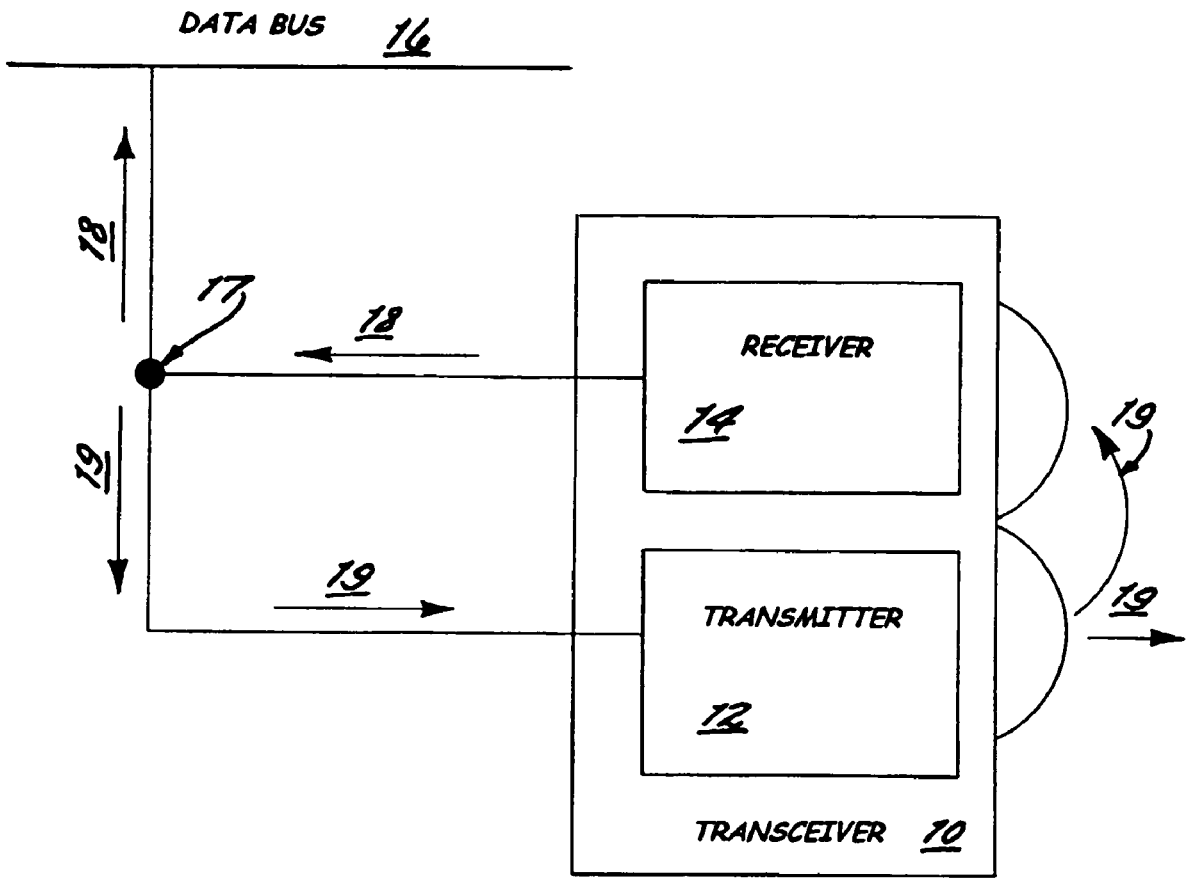
FIG. 21 is a block diagram of a conventional apparatus used for transmitting and receiving data from the data bus of a vehicle.

One problem with providing remote, approximate real-time data communication is the data bus infrastructure and protocol and the data communication devices themselves. With reference to FIG. 21, some of the problems associated with wireless communication with the data bus of a vehicle are illustrated. Specifically, FIG. 21 shows a transceiver 10 for transmitting to and receiving data from a remote location to be applied to the data bus of a vehicle. The transceiver includes both a transmitter 12 and a receiver 14 connected to the data bus 16 of a vehicle. In this illustration, the data bus uses J1708 protocol and is a differentially driven, twisted pair. As discussed previously, the data bus does not include a read and write data communication line. Instead, both the transmitter and the receiver of the infrared device are commonly connected to the bus at a node 17. This common connection causes problems when data is transmitted from the receiver of the transceiver to the data bus.

Specifically, when the receiver 14 of the transceiver receives data 18, the data 18 is applied to the data bus 16. Because of the common connection at the node 17, the data 18 is also applied to the transmitter line of the transmitter 12. As such, as data is applied to the data bus, it is also transmitted by the transceiver. This is first problematic because the data transmitted by the transceiver, which is referred to herein as false data 19, is transmitted to a remote interrogation device and is basically bad data. Secondly, as the transmitter 12 transmits the data, the receiver 14 of the transceiver also receives the false data 19. Left unchecked, this false data 19 will potentially corrupt not only the remote interrogation device but also the data bus.

Because of the infrastructure and protocol of the data bus and problems associated with transceivers receiving what they transmit, these problems must be addressed as part of signal processing when data is transmitted to and received from a remote location in a wireless format. Because of this data processing problem, many conventional add on wireless systems buffer the data, because they cannot process the data without significant delays. As discussed, however, buffering of the data in many instances requires reconfiguring existing software of interrogation devices, which can be costly. As such, communication systems are needed that alleviate the problems with false data without requiring added delay, such that data may be transmitted to and from the data bus of the vehicle in an approximate real-time manner.

In addition to problems associated with the delays in remote, wireless data communication with the data bus of a vehicle, there are may be particular problems associated with the limited transmitting and receiving range of most transceivers. As discussed, some vehicles, such as heavy duty vehicles, use data bus infrastructures and protocol that require interrogation devices to wait for an idle state on the bus prior to transmitting information to the data bus. A problem is presented when a transceiver is connected to the data bus of the vehicle for receiving external signals such as RF or IR signals. Specifically, when not in use for data communication, the transceiver may receive spurious noise signals from various sources that may be input on the data bus and corrupt data on the data bus. For example, in the cases of IR transceivers, light from the headlights of other vehicles or sunlight may be received by the transceiver and applied to the data bus. Similarly, in the case of RF transceivers, spurious RF signals from many sources such as radios, cell phones, etc. As such, a communication system is needed that isolates the data bus from remote data input when a remote data communication link is not established with the data bus.

An additional problem with wireless, remote data communication may be caused by the transmission and reception ranges of the interrogation devices. For example, in instances in which the interrogation devices uses RF communication, there is a limited coverage area within which the interrogation device may receive and transmit data. A similar problem may be experienced in instances where IR communication is used. Specifically, most IR transceivers have limited horizontal transmission and reception ranges, such that vehicles outside the range may receive either intermittent or corrupted data signals. In these instances, it is typically not advantageous to establish a data communication link with a vehicle that is either outside or on the fringe of the transmitting and receiving range of the transceiver.

Problems may also be realized where there are several vehicles in an area with which a remote interrogation device wishes to establish a data communication link. For instance, if the interrogation device is used in a garage or shipyard setting, the use of the interrogation device may wish to communicate with either a particular vehicle or several of the vehicles one at a time. Similarly, in a factory setting, the user of the interrogation device may wish to correspond with vehicles one at a time as they move past the interrogation device. Problems may occur, however, where two or more of the vehicles attempt to establish a data communication link with the interrogation device at the same time. As such, systems are needed that accommodate for the transmission and reception limitations of the transceivers. Additionally, systems are needed that provide for establishing a data link with one vehicle in an environment where several vehicles are present.

The apparatus, methods, and computer programs products discussed in detail below are used in conjunction with wireless transmission systems and remote interrogation devices. The various apparatus, methods, and computer program products are detailed below in conjunction with the data bus of a heavy duty vehicle, such as a tractor-trailer combination. It should be understood that this disclosure is for illustrative purposes only and is not meant to limit the scope of the present invention. Specifically, the present invention may be conFIG.d to operate within the specific architecture of the data bus of many different types of vehicles. For instance, the present invention may be used with cars, trucks, vans, tractors, and other farm equipment, construction equipment, aircraft, trains, etc.

As detailed above an initial problem with remote data communication with the data bus of a vehicle is the infrastructure and protocol used by the bus and the transceiver. Specifically, because the data bus requires approximate real-time data communication to determine the idle states of the data bus, excessive delays in the data communication link with the data bus may not be acceptable. For example, many conventional wireless systems have sufficient data processing delays such as that data must be buffered and the software of the interrogation device must be reprogrammed to account for this buffering of data. An additional problem is because of the infrastructure and protocol of the data bus and the nature of the RF and IR transceivers, data transmitted to and from the data bus is also received as false data. This false data can corrupt either the data bus or the remote interrogation device.

Figure 22:
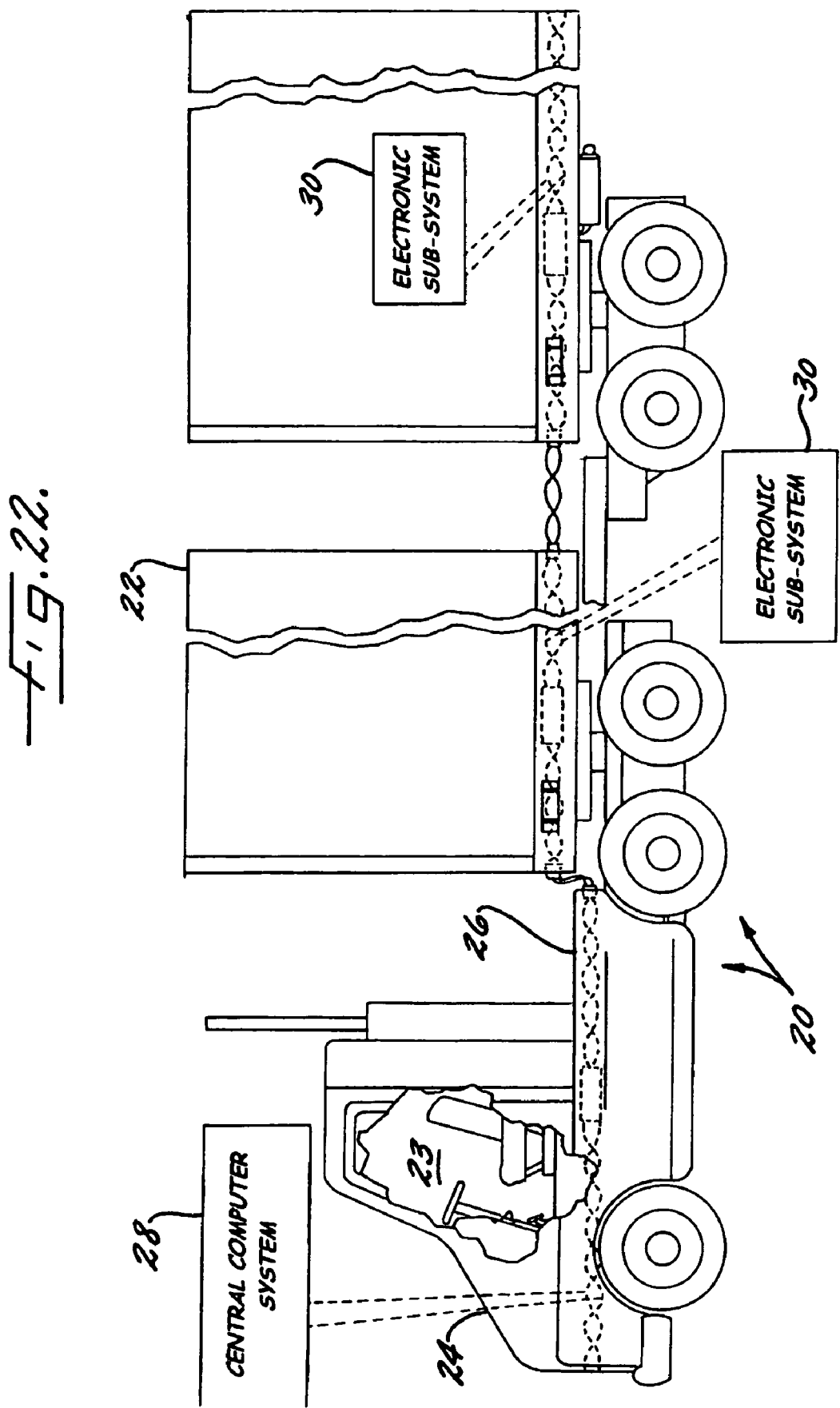
FIG. 22 is a side elevation view of a vehicle in which the various apparatus, methods, and computer program products may be implemented to establish a remote data communication link between the vehicle and a remote interrogation device.

With references to FIGS. 22 and 23, an apparatus according to one embodiment of the present invention is illustrated in conjunction with the data bus of a vehicle. With reference to FIG. 22, an illustration of a typical vehicle with which the present invention may be implemented is shown. Specifically, FIG. 22, illustrates a tractor-trailer combination vehicle 20, including a trailer 22 and a tractor 24 for pulling the trailer. Importantly, the vehicle includes a data bus 26 that is routed through the tractor and trailer for transmitting data between a central computer system 28 and various sub-systems 30 As known to those skilled in the art, the various sub-systems provide a variety of information relating to the vehicle and its cargo. For instance, a vehicle may include subsystems that provide information such as the identification of the vehicle, individual tire pressures, milage, cargo, information, anti-lock brake status, engine status, engine diagnostics, etc.

The data bus of a tractor-trailer vehicle is typically a physical RS 485 differentially driven, twisted pair and the standard protocol is JI708 or JI939. In the case of JI708 protocol, the bus is differentially driven at 9600 baud, while the JI939 is a CAN protocol and differentially driven at 250 kilo-baud. The twisted pair is half duplexed such that one wire transmits the data with a logic 1 as the idle state and the second wire is a mirror image for data transmission. The data bus does not include a command for transmitting data. Instead systems wishing to transmit on the data bus must wait for an idle state on the data. The protocol typically uses non-return to zero (NR2) encoding and includes a start bit of logic 1 and a stop bit of logic zero that proceed and trail each 8 bit data packet. Because each data packet is 10 bits and the last or stop bit is logic zero, a string of 10 logic 1 bits defines an idle state on the bus.

With references to FIG. 23, to communicate with the data bus of the vehicle, the present invention provides an apparatus 32 for invalidating with minimal delay data transmitted to the data bus and data transmitted from the data bus. The apparatus 32 includes a local transceiver 34 that is in operable electrical communication with the data bus 26 of the vehicle shown in FIG. 22. Connected to both the data bus and the transceiver is a processor 36. The processor includes a bus input line 38 for inputting data to the data bus output line 40 for receiving data from the data bus for transmission to a remote location. The processor also includes a remote input data line 42 for receiving data from the local transceiver for input to the data bus and a remote output line 44 for transmitting data from the data bus via the transceiver to a remote location. Remote from the data bus is an interrogation device 46. The interrogation device includes a remote processor 48 and a remote transceiver 50.

As discussed above, communication systems are needed that can transmit data to and from the data bus with minimal delay such that neither the data bus nor the software used by the interrogation devices sense a delay. Further, communication systems are needed that prevent the introduction of false data into either the data bus or a remote location. The apparatus of the invention can overcome these problems. Specifically, the local and remote processors, 36 and 48, of the present invention analyze data transmitted from the data bus bit by bit such that the data is analyzed with minimal delay. Additionally, the local and remote processors, 36 and 48, of the prevention propagation of false data to either the data bus or to the remote location such that neither the data bus nor a remote interrogation device are corrupted.

Figure 24:
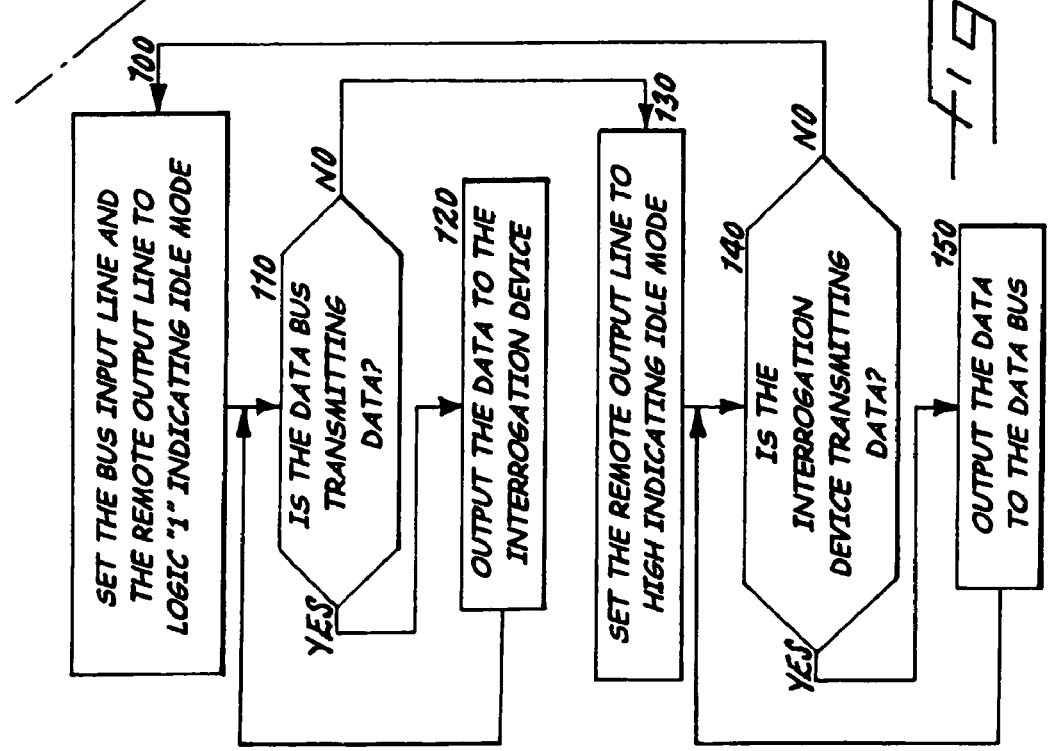
FIG. 24 is a block diagram of the operations performed to validate with minimal delay data transmitted to a data bus of a vehicle from a remote location and data transmitted from the data bus of the vehicle to a remote location according to one embodiment of the present invention.

Specifically, with reference to FIG. 24, to analyze the data bit by bit and prevent propagation of false data, both the local and remote processors analyze the data as described below. The method illustrated in FIG. 24 is described with relation to the local processor 36, however, it is understood that similar steps are performed by the remote processor 48. Initially, the local processor 36 sets the bus input line 38 and the remote output 44 to logic 1 indicating an initial idle state to both the data bus and the remoter interrogation device. (See step 100). The processor 36 initially analyzes the bus output line 40 to determine whether the data bus is transmitting data to the remote interrogation device. (See step 110). If the bus output line 40 contains data (i.e., contains a logic 0), the processor 36 outputs the data on the remote output line 44, (see step 120), which, is turn, is transmitted by the transceiver to the remote interrogation device. The processor 36 continues to transmit data on the remote output line 44 as long as the bus output line is 40 contains data. (See steps 110 and 120). As described later, if the bus out put line is 40 does not contain data, the processor 36 analyzes the remote input line 42 to determine whether the remote interrogation device is transmitting data. (See step 140).

When data is no longer transmitted on the bus output line 40, the processor 36 sets the remote output line 44 to high indicating that it is idle. (See step 130). Next, the processor 36 analyzes the remote input line 42 to determine whether the remote interrogation device is transmitting data to the data bus. (See step 140). If the remote input line contains data (i.e., Contains a logic 0), the processor 36 outputs the data on the bus input line 38, (see step 150), which, in turn, is applied to the data bus. The processor 36 continues to transmit data on the bus input line 38 as long as the remote input line 42 contains data. (See step 140 and 150). When data is no longer transmitted on the remote input line 42, the processor 36 sets the bus line 38 to high indicating that it is idle. (See step 160).

With reference to the operation of the processor as illustrated in FIG. 4, the present invention prevents propagation of false data to both the data bus and the interrogation device. Specifically, as described in FIG. 21, due to the data bus infrastructure and protocol and due to the transceivers, data transmitted to the data bus and to the remote interrogation is device is received by the local and remote processors, 36 and 48, as false data. The present invention prevents the propagation of false data by analyzing the data as described above. Specifically, when data is transmitted on the bus input line 38, (see step 150), the processor does not evaluate data present on the bus output line 40. As such, false data applied to the bus output line 40 when data is transmitted on the bus input line 38 to the data bus is not transmitted to the remote interrogation device via the transceiver. Similarly, when data is transmitted on the remote output line 44, (see step 120), the processor does not evaluate data present on the remote input line 42. As such, false data applied to the remote input line 42 by the transceiver receiving the data transmitted by it to the interrogation device is not applied to the data bus.

As detailed above, the processors, 36 and 48, of the present invention analyze the data one bit at a time, such that delay in data transmission is minimal. To accomplish this a processor is needed that analyzes the data at processing speeds corresponding to the baud rate of the data bus. Specifically, a bus that operates on the J1708 standard has a baud rate of 9600 bits/second or 104 microseconds ($10^{-6}$) per bit. In this embodiment, processors are needed that operate at a significant data processing speed such as that several instructions for analyzing the data can be performed without causing a delay in communicating at the 9600 baud rate used by the bus. For instance, if the processor has an operating speed of 200 nanoseconds ($10^{-9}$), then the processor can perform 250 instructions (i.e., 104 microseconds/200 nanoseconds). However, the number of instructions that may be performed must be reduced by the delay for transmission of the data. Specifically, there is associated delay with IR and RF transmission of the data that reduces the time allowed for processing of the data. As an example, in one embodiment of the present invention, the processors operate at speeds of 200 nanoseconds and the data is transmitted using IR. In this embodiment of the present invention, the processor is controlled via software to analyze each bit of the data with 10 to 20 instructions, such that the data can be analyzed and transmitted within the baud rate limitations of the bus. To minimize the number of instructions, assembly code is used. As such, the present invention creates an approximate real-time data link between the bus and the remote interrogation device. Importantly, the present invention performs analysis and transmission of the data with minimal delay such that as seen by the data bus and the interrogation device wherein a virtual wire connects the two. Thus, existing software in an interrogation device does not need updating to retrofit the device for wireless data communication.

As discussed the present invention analyzes the data bit by bit to process the data with minimal delay. To increase the processing time for the data, in one embodiment of the present invention, the processors do not delay until it has received the bit value before processing. Instead, in one embodiment of the present invention, the processors determine the value of a data bit by sensing transition in logic states in the data based on logic transitions, the present invention can minimize delay in processing and transmitting the data.

In addition, to providing apparatus and methods, the present invention also provides computer program products for validating with minimal delay data transmitted to a data bus of a vehicle from a remote location and data transmitted from the data bus of the vehicle to a remote location in a system where data transmitted to and from the data bus may also be received as false data. With reference to FIG. 3, the computer readable storage medium may be included within the processors, 36 and 48, of the present invention or may include a separate memory device, not shown. The computer readable program code means may be implemented by the processors to analyze the data bit by bit.

The computer-readable program code means for analyzing data transmitted to and from the data bus one bit at a time such as data may be transmitted to and from the data bus with minimal delay. Further, the computer-readable program code means also includes second computer-readable program code means for preventing propagation of false data to the remote location when data is transmitted to the data bus and propagation of false data to the bus when data is transmitted from the data bus to the remote location.

With reference to the first computer-readable program code means, as discussed previously with respect to the various apparatus and methods of the present invention, the first computer-readable program code means analyzes the data received bit by bit to decrease delay. Additionally, in some embodiments, the first computer-readable program code means may determine the value of each bit of the data by sensing transition in logic states in the data such that the computer program product processes the data with minimal delay.

With reference to the second computer-readable program code means, as discussed previously with respect to the various apparatus and methods of the present invention, the second computer-readable program code means may prevent propagation of false data by processing the data one bit at a time and ignoring false data that is received when data is transmitted to or from the data bus.

In this regard, FIGS. 23 and 24 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instructions means which implement the functions specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, can be implemented by special purpose hardware-based computer systems which perform the specified functions or steps, or combinations of special purpose hardware and computer instructions.

In addition to providing apparatus, methods, and computer program products for processing data bit by bit and preventing propagation of false data in the form of looped date, the present invention also provides an apparatus and methods for establishing a data communication link with the data bus of a vehicle. As illustrated, the apparatus of the embodiments detailed later below include local and remote processors for establishing a data communication link between the interrogation device and the data bus of the vehicle. Specifically, the local and remote processors of the following embodiments are used to establish data links, transmit heartbeat signals, and store and process data. It should be understood that the local and remote processors discussed below herein may be the same processors that are also used as described above to process transmitted data bit by bit and prevent introduction of looped or false data.

In at least one implementation of the present invention, however, dedicated local and remote processors are used for the functions of bit by bit processing and prevention of propagation of looped or false data as fast processing times are required. For higher level processing, however, such as establishing a data link, local and remote master processors are preferably used. These master-type processors are in electrical communication with the transceiver, dedicated processor, and the data bus. In the various embodiments illustrated and discussed below, the processors are referred to generically as local and remote processors. It should be understood that each local and remote processor may include a dedicated processor and a master processor or, alternatively, a single processor for performing all of the various functions. Therefore, the local and remote processors will be hereinafter referenced as such without further reference to the dedicated and master processors.

Figure 25:
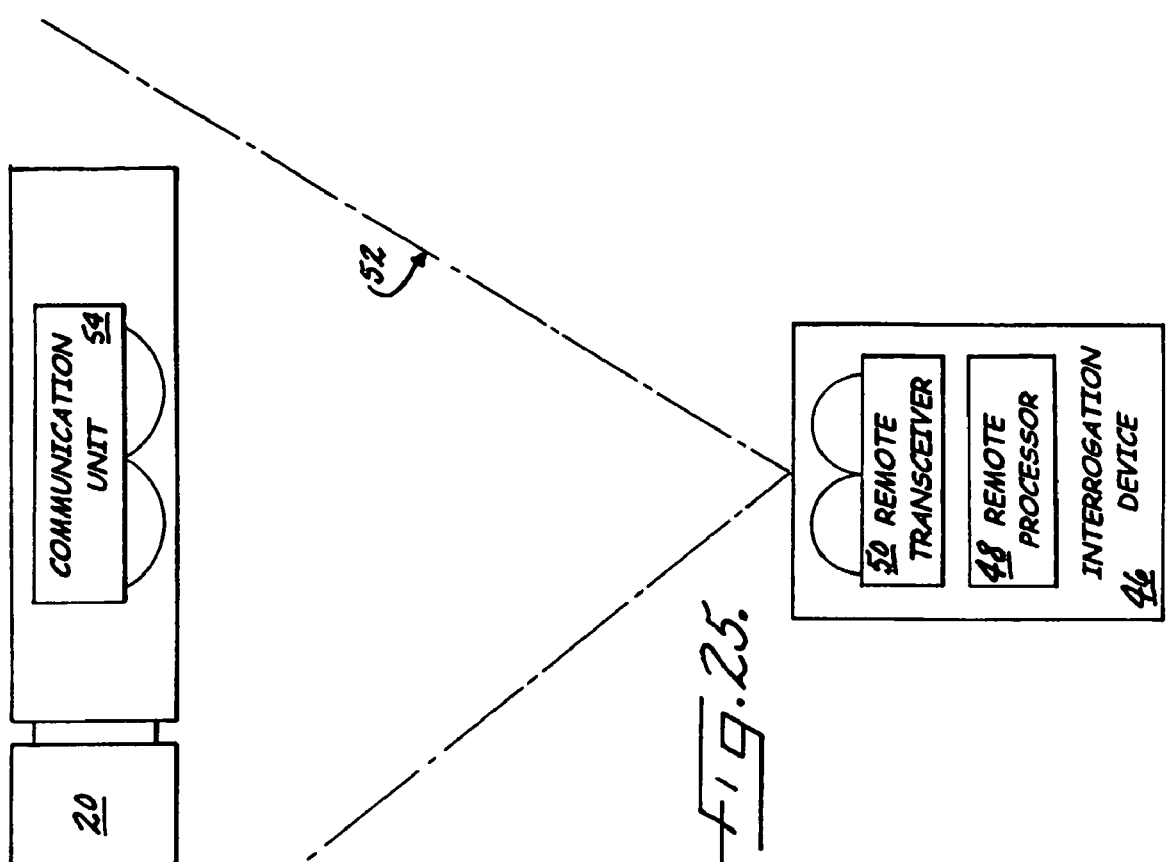
FIG. 25 is a partial block diagram and top view of a remote interrogation device in relation to a vehicle for which the present invention may be used to establish a data communication link.
Figure 27:
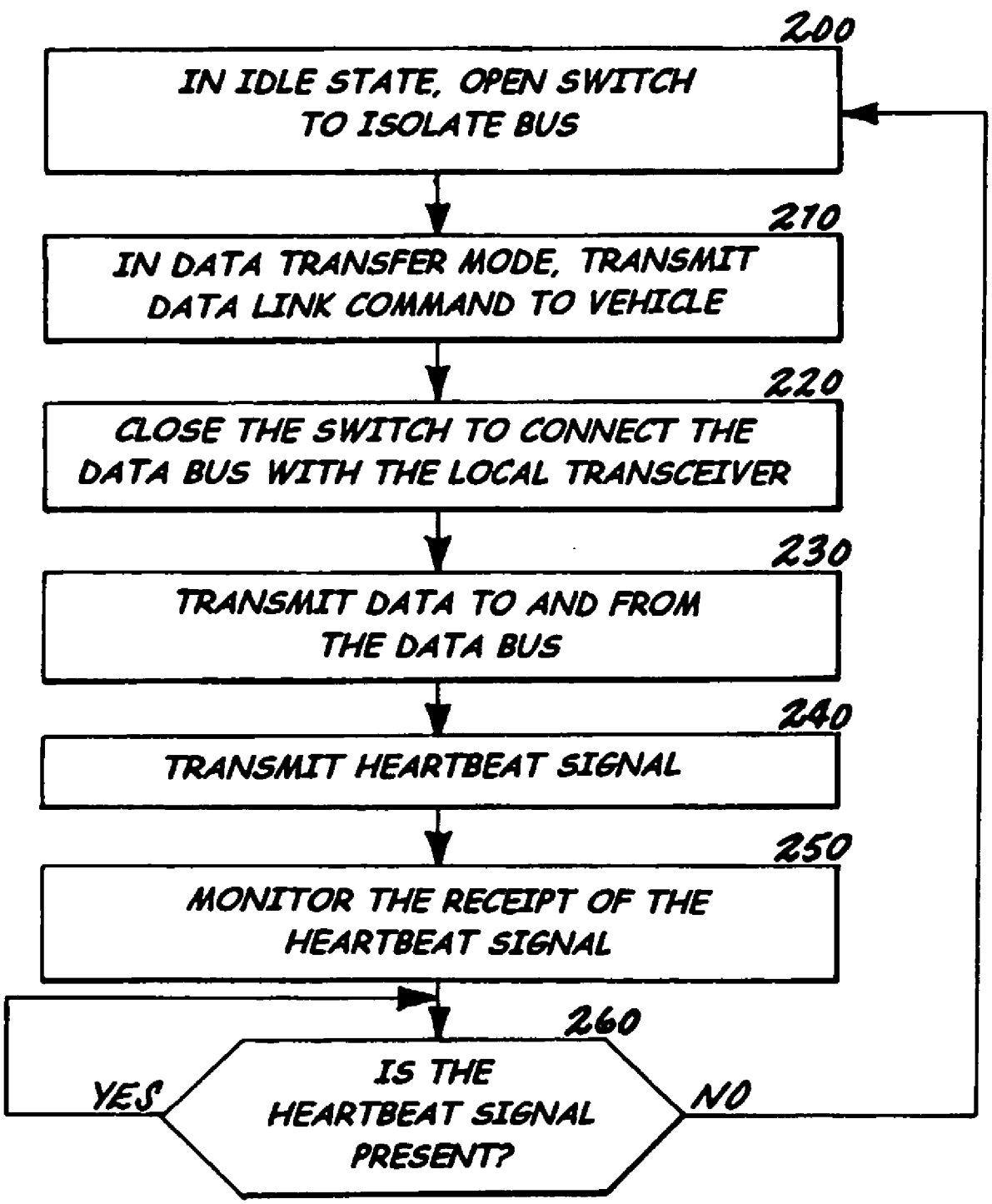
FIG. 27 is a block diagram of the operations performed to establish a data communication link between a data bus of a vehicle and a remote interrogation device where unwanted signals may be received by the data bus and corrupt data on the data bus according to one present invention.

In addition to processing data transmitted to and from the data bus with minimal delay, the present invention also provides apparatus and methods for establishing a data communication link between the data bus of a vehicle and a remote interrogation device. For instance, one embodiment of the present invention, provides a method and apparatus that establish a communication data link between an interrogation device and the data bus of a vehicle, whole also preventing the introduction of signal noise into the data bus. With reference to FIGS. 25-27, the environment in which the present invention is used and the apparatus and method are illustrated.

With reference to FIG. 25, in a typical embodiment, the present invention is used to receive and transmit data to and from the data bus of a vehicle from a remote interrogation device. This may be in a manufacturing setting, where the vehicle is moving past the interrogation devise on an assembly line, in a freight or rental car return depot, on highways where vehicles are known to pass, in maintenance shops, etc. In these settings, the vehicle 20 is at a remote location from the interrogation device 46 and has a communication unit 54. The interrogation device typically has as limited transmission range 52, outside of which the communication unit of the vehicle and interrogation device will either receive corrupted and/or intermittent data signals. As such, it is typically advantageous to selectively establish a data communication link when the vehicle is within the transmission and reception range of the interrogation device.

With reference to FIG. 26, an apparatus according to one embodiment of the present invention for establishing a data communication link between a data bus of a vehicle and a remote interrogation device, where unwanted signals may be received by the data bus and corrupt data on the data bus, is shown. Specifically, the apparatus of this embodiment includes a local transceiver 34 in operable electrical communication with the data bus 26 for transmitting data from the data bus. Connected to the transceiver 34 and the data bus 26 is a local processor 36. Further, the apparatus of this embodiment includes a switch 56 in operable electrical communication with the local processor, local transceiver, and the data bus. Importantly, in a closed position, the switch connects the local transceiver and the data bus and in an open position isolates the local transceiver from the data bus. Remote from the vehicle is an interrogation device 46. The interrogation device includes a remote processor 48 in electrical communication with a remote transceiver 50.

The apparatus of this embodiment of the present invention is important as it isolates the data bus of the vehicle from receipt of corrupted data and signal noise when the vehicle is either not within the transmitting and receiving range 52 of the interrogation device 50 or a data bus of the vehicle.

Specifically, with reference to FIG. 27, in an idle mode, in which a data communication link is not established between the data bus and the interrogation device, the local processor opens the switch such that the data bus in not in electrical communication with the local transceiver. (See step 200) As such, false data in the form of signal noise received by the local transceiver from external sources, such as the sun and automobile headlights in the case of IR transmission and spurious RF signals in the case of RF transmission is not input on the data bus. In a data transfer mode, however, in which it is desired to form a data communication link between the data bus of the vehicle and the interrogation device, the remote processor 48 of the interrogation device transmits a data link command to the local processor 36. (See step 210). After receiving the data link command, the local processor closes the switch to thereby establish a data link between the data bus and the remote processor. (See step 220). As such, the present invention alleviates the introduction of signal noise when data is not transmitted to the data bus of the vehicle, while also allowing a data communication link to be established between the data bus and the remoter interrogation device in a data transfer mode.

As illustrated above, the remote processor, in a data transfer mode, transmits a data link command to the local processor of the present invention, such as the local processor closes the switch to thereby establish a data communication link between the data bus and the interrogation device. In some embodiments of the present invention, it is advantageous to also notify the local processor when a data communication link has ended such that the local processor may again open the switch to alleviate the introduction of signal noise.

Specifically, with reference to FIG. 27, in one embodiment of the present invention, when transmitting data to the data bus in a data transfer mode, (see step 230), the remote processor also periodically transmits a heartbeat signal to the local processor. (See step 240). The heartbeat signal is sent at predetermined time intervals and indicates to both the local and remote processors that a data communication link is established. In this embodiment, both the local and remote processors monitor the receipt of the periodic heartbeat signal. (See step 250). When either the local or remote processor is finished transmitting data, they will cease transmitting the heartbeat signal. If the heartbeat signal is not received by the local processor within the predetermined time interval from the last time the heartbeat signal was received (see step 260), the local processor opens the switch thereby isolating the data bus from the local transceiver. (See step 200). If the heartbeat signal is not received by the remote processor within the predetermined time interval from the last time the heartbeat signal was received (see step 260), the remote processor will stop transmitting or attempting to receive data.

As discussed, the heartbeat signal may be terminated by the local or remote processor when a data communication link has ended. In addition, the heartbeat signal may also cease if the vehicle or the remote interrogation device are moved relative to each other, such that one or neither are no longer within receiving range of the heartbeat signal. Specifically, due to the environment, orientation of the vehicle to the interrogation device, position of the vehicle on the fringe of the transmission and reception range of the interrogation device, or movement of the vehicle outside the transmission and reception range of the interrogation device, the data communication link may become distorted. In this embodiment, the heartbeat signal may not be received by either the local or remote processor indicating that the data communication link may become distorted. In this embodiment, the heartbeat signal may not be received by either the local or remote processor indicating that the data communication link has become tenuous and no longer viable. As such the local processor will open the switch to prevent false data in the form of signal noise from entering the data bus, and the remote processor will stop transmitting or attempting to receive data.

As discussed above, the local and remote processor transmit a heartbeat signal at predetermined time intervals. This predetermined time interval is typically selectable either by programming the processors or altering jumpers that are associated with the processors. The predetermined time interval may be any time interval. A typical time interval in the range of 1 to 5 seconds between transmission of the heartbeat signal is typically used.

In an alternative embodiment, a heartbeat signal is not used. Instead, the local and remote processors may analyze errors in the data transmitted. In this embodiment of the present invention, the processors monitor the data for errors and determine that the data communication link is no longer viable when a predetermined percentage of the data is received in error.

In addition to establishing a data communication link between one vehicle and a remote interrogation device, the present invention also provides an apparatus and methods that establish a data communication link with one vehicle, when more than one vehicle is located in the transmission and reception range of the interrogation device. There may be instances in which two vehicles are within the vicinity of the interrogation device, such as in a freight yard, etc. In these instances, it is typically preferable that the interrogation device establish a data communication link with the vehicles one at a time, such that data bound for one vehicle is not received by the interrogation device. Further, it is typically advantageous that the remote interrogation device establish a data communication link with a vehicle that is situated within the transmission and reception range of the interrogation device, as opposed to a vehicle either on the fringe or outside the transmission and reception range of the interrogation device.

Figure 28C:
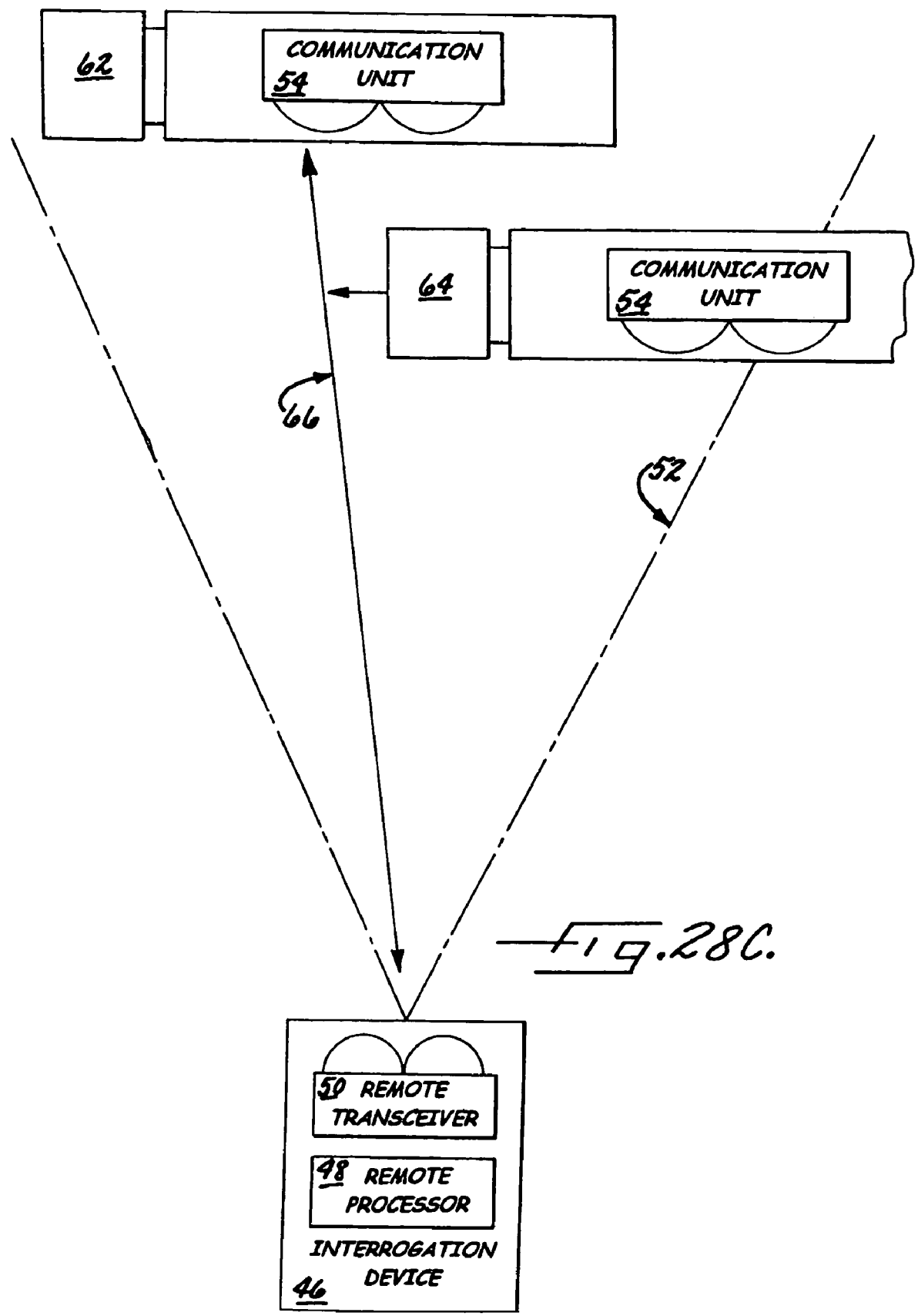

FIGS. 28A-28C illustrate three separate scenarios in which a system is needed to determine which of these vehicles the remote interrogation device should establish a data communication link. These FIG.s do not illustrate all possible scenarios, but merely are representative scenarios. With reference to FIG. 8A, there may be instances in which two or more vehicles, namely 62 and 64, are located in the receiving range 52 of the interrogation device 46 at the same time. In this instance, it is preferable that the interrogation device establish a data communication link with only one of the vehicles at a time. Similarly, in FIG. 28B, one of the vehicles, namely 64, may be located in the fringe portion of the transmitting and receiving range of the interrogation device. In this instance, it is preferable for the interrogation device to form a data communication link with the vehicle 62 located in the transmitting and receiving ranges of the interrogation device, as opposed to the vehicle on the fringe, as data communication with the vehicle on the fringe may have a higher chance of data errors. Finally, FIG. 28C illustrates an instance in which an interrogation device has an established communication link 66 with a first vehicle, while a second vehicle 64 enters the transmitting and receiving range of the interrogation device. In this instances, it is preferable for the interrogation device to maintain the data communication link 66 with the first vehicle 62, and for the second vehicle 64 to not receive or send data until further data communication link has ended.

With reference to FIG. 29, an apparatus according to one embodiment for establishing a data link between a data bus of one of at least two vehicles and an interrogation is illustrated. In this embodiment of the present invention, the interrogation device 46 includes a remote processor 48 and a remote transceiver 50. Additionally, each of the vehicles, 62 and 64, include a communication unit 54. Each of the communication units, in turn, includes a local transceiver 34 in operable electrical communication with the data of the associated vehicle. The communication devices also include a local processor 36 and a switch 56 in operable electrical communication with both the local transceiver and the data bus. Importantly, each of the communication units also includes a counter 58 in electrical communication with the local processor. Further, each of the vehicles has an associated individual data link threshold value that is typically different from the other vehicles.

As discussed the apparatus of this embodiment can be used to determined with which vehicle the interrogation device should establish a data communication link. For example, in the instance illustrated in FIG. 28A, the apparatus of the present invention establishes a data communication link with one of the vehicles. Specifically, with reference FIG. 30, to establish a data communication link, the remote processor of the interrogation device, initially transmits a periodic data link command. (See step 320). Each of the local processors of each of the vehicles monitors receipt of the periodic data link command (see step 330), and the counter counts the number of times the data link command has been sent. (See step 350). Each of the local processors compares the number of times the data link command has been received at the individual data link threshold value associated with the vehicle. (See step 360). This process is continued until the number of times the data link command is received by one of the local processors equals the individual data link threshold value associated with the vehicle. (See step 370). At this point, the local processor associated with the vehicle closes the switch connecting the data bus to the local transceiver to thereby establish a data communication link between the data bus of the vehicle and the remote processor of the interrogation device. (See step 380).

As a data communication link is established with the interrogation device and one of the vehicles, it is advantageous to ensure that the other vehicle does not attempt to establish a data communication link with the remote interrogation device until the data communication link between interrogation device and the first vehicle is complete. To accomplish this, after the interrogation device has established a communication link with the first vehicle, it ceases transmission of the periodic data link command. (See step 360). As the local processor of the vehicle with which the interrogation device is not currently linked no longer receives the periodic data link command, the local processor of the vehicle will not attempt to establish a data communication link with the interrogation device.

As detailed above, each of the vehicles has an associated data link threshold value that is different from the other vehicle. Although it is possible to assign each of the vehicles to be interrogated an individual data link threshold value, in some case, where there are a large number of vehicles, this may not be practical. For example, some trucking companies may have several hundred vehicles. In this instance, assigning a number to each vehicle may cause some vehicles to have such large data link threshold values that the vehicle may have to receive an impractical number of data link commands prior to establish a data communication link with the interrogation device.

Figure 30:
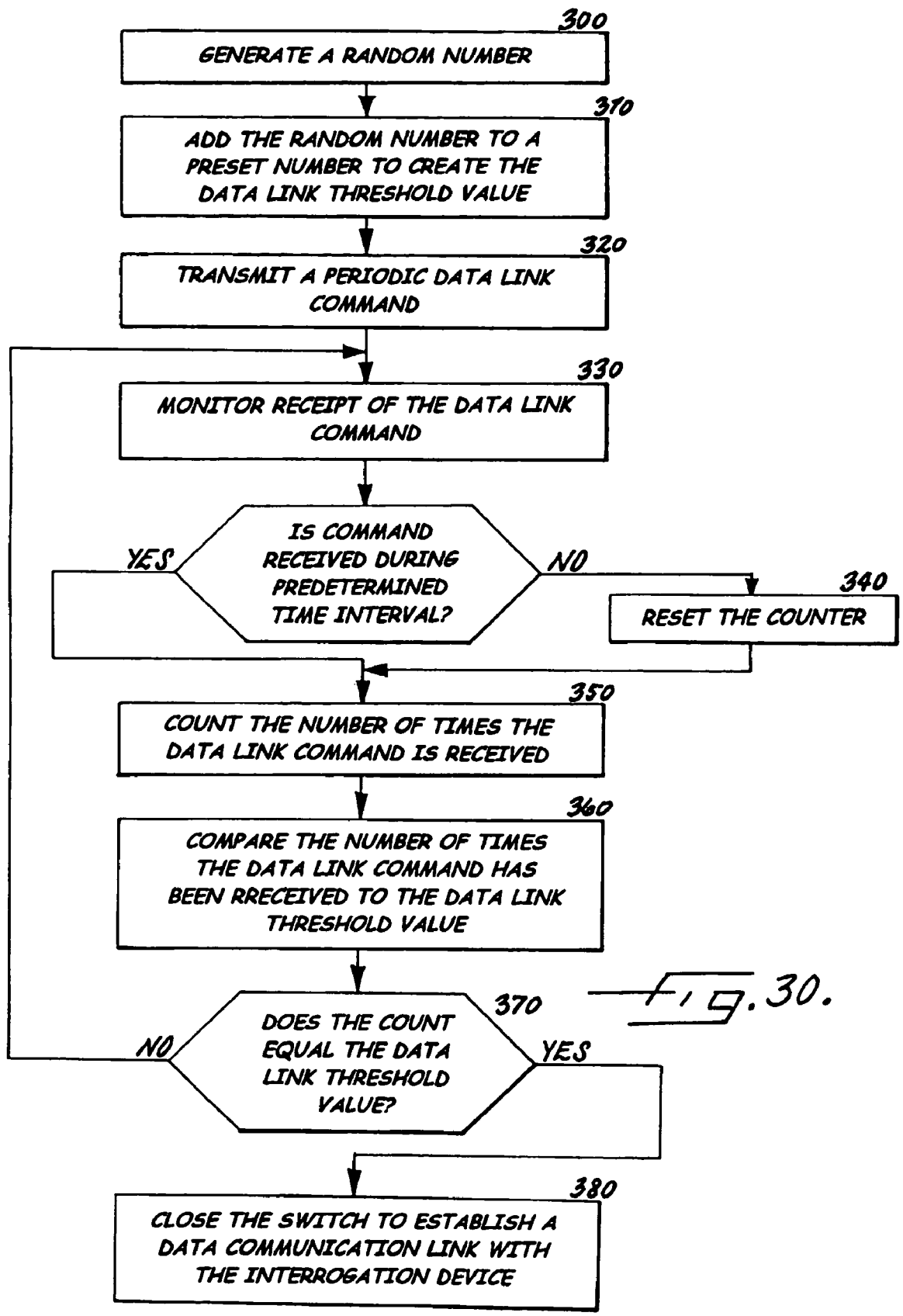
FIG. 30 is a schematic block diagram of the operations performed to establish a data link between a data bus of one of at least two vehicles and an interrogation device having a remote processor and a remote transceiver according to one embodiment of the present invention.

With reference to FIG. 29, to remedy this, in one embodiment of the present invention, the communication unit 54 associated with each vehicle further includes a random number generator 58 in electrical communication with each of the processors 36 and 48. With reference to FIG. 30, in this embodiment, random number generators for each device initially generate a random number. (See step 300). The local processor for each vehicle adds the random number to a preset number that is typically the same for all of the vehicles to create an individual data link threshold value. (See step 310). Similar to previous embodiments, the remote processor of the interrogation device, transmits a periodic data link command, (See step 320), and each of the local processors of each of the vehicles monitors receipt of the periodic data link command (see step 330), and the counter counts the number of times the data link command has been sent (see step 350). Each of the local processors compare the number of times the data link command has been received to the individual data link threshold value associated with the vehicle. (See step 360). When the number of times that the data link is received by one of the local processors equals the individual data link threshold value associated with the vehicle, (see step 370), the local processor associated with the vehicle closes the switch connecting the data bus to the local transceiver to thereby establish a data between the data bus of the vehicle and the remote processor of the interrogation device. (See step 380).

As discussed previously, FIG. 28B illustrates an instance in which one vehicle 62 is located in the transmitting and receiving range of the interrogation device and another vehicle 64 is located on the fringe of the transmitting and receiving range of the interrogation device. In this instance, the vehicle 64 located on the fringe portion of the transmitting and receiving range 52 is more likely to receive either corrupted or intermittent data link communication commands from the interrogation device. As such, it may be advantageous for the interrogation device to establish a data communication link with the vehicle designated 62 as opposed to the vehicle 64 on the fringe of transmission and reception range of the interrogation device.

To increase the chances that the interrogation device will establish a data communication link with the vehicle 62, in one embodiment of the present invention, every time a data communication link is missed by the local processor of a vehicle, the local processor resets the associated counter. Thus, the counter begins counting the number of times the data communication link is received from zero. In this embodiment, the data communication link command must be received a consecutive number of times that is equal to the data link threshold value before the local processor associated with the vehicle will establish a data communication link with the interrogation device. As such, vehicles located on the fringe or outside of the transmission and reception range of the interrogation device, that may receive either a corrupted or intermittent data link commands, will be less likely to establish a data communication link with the interrogation device.

With reference to FIG. 30, in this embodiment, the random number generators for each communication unit initially generate a random number. (See step 300). The local processor for each vehicle adds the random number to create an individual data link threshold value. (See step 310). The remote processor of the interrogation device sequentially transmits a periodic data link command at a predetermined time interval between transmissions (see step 320) and each of the local processors of each of the vehicles monitors receipt of the periodic data link command. (See step 330). If the current periodic data link command is not received within the predetermined time interval from last receipt of the data link command, the local processor resets the counter. (See step 340). If the data link command is received within the predetermined time interval, however, the counter increases the counts to indicate the number of times the data link command has been received consecutively. (See step 350). Each of the local processors compares the number of times the data link command has been received to the individual data link threshold value associated with the vehicle. (See step 360). When the number of times the data link command has been received by one of the local processors equals the individual data link threshold value associated with the vehicle (see step 370), the local processor associated with the vehicle closes the switch connecting the data bus to the local transceiver to thereby establish a data communication link between the data bus of the vehicle and the remote processor of the interrogation device. (See step 380).

As detailed above in relation to this embodiment, the data communication link must be received by the local processor of the vehicle a consecutive number of times equal to the data link threshold value before the local processor will establish a data communication link. In light of this fact, in some embodiments, the data link threshold value for each vehicle, and in the case where a random number generator is used, the preset portion of the data link threshold value may be chosen to have a relatively large value. The value is chosen sufficiently large such that the vehicle 62 located within the transmission and reception range of the interrogation device is more likely to receive the data communication link more consecutive times and thereby exceed the individual data link threshold value sooner than the vehicle 64 located on the fringe. Specifically, because the vehicle 64 on the fringe receives the signal intermittently, it will continue to reset the counter each time a data link command is missed, and the counter will more likely not reach a count that equals the individual data link threshold value. This result may also be accomplished by evaluating the number of errors received by the local processors for each vehicle.

With reference to FIG. 28C, the present invention also provides apparatus and methods that prevent the interrogation device from establishing a data communication link with a second vehicle 64 that has entered the transmitting and receiving range of the interrogation device while the interrogation device has established a data communication link 66 with a first vehicle 62. Specifically, as discussed previously, after the interrogation device has established a data communication link with one vehicle, it ceases transmission of the data link command until the data communication link with the vehicle has ended. As such, in situations where a second vehicle 64 enters the transmission and reception range of the vehicle, the second vehicle will not receive the data link command and will not attempt to establish a data communication link with the interrogation device.

As detailed above, the interrogation device typically has a transmission and reception range outside of which the data signal may be corrupted, intermittent, or non-existent. It should be understood that the transmission and reception range of the interrogation device may also be manipulated to either narrow or expand to some extent the transmission and reception range of the interrogation device. For instance, in a setting where several vehicles are located close together, the transmission and reception range of the interrogation device may be physically narrowed, such that the interrogation device may be focused on a particular vehicle of interest.

In addition, the remote interrogation device may focus the system to communicate with one particular vehicle or a group of vehicles by commanding vehicles in which the interrogation device is not interested to remain idle. In this embodiment of the present invention, the interrogation device may transmit an idle command that includes a list of vehicle identification numbers. Vehicles having one of these identification numbers will receive the command and not attempt to establish a data communication link with the interrogation device. Similarly, the interrogation device may transmit a command that includes a list of vehicle identification numbers that the interrogation device wishes to establish data communication. In this instance, only vehicles having corresponding identification numbers will attempt to establish a data communication link with the interrogation device.

Due to the limited transmission and reception range of the interrogation device, in some embodiments, it is advantageous to provide an indication to the driver of the vehicle or to the user of the interrogation device when the vehicle is within the transmission and reception range of the interrogation device. Specifically, with reference to FIG. 29, either the interrogation device or each communication unit may further include an indicator 60 in electrical communication with either the local or remote processor to indicate when the vehicle is in the transmitting and receiving range 52 of the interrogation device. Specifically, in instances in which the indicator is connected to the local processor of the communication unit, when a data link has been established with the remote processor of the interrogation device, the local processor may control the indicator to indicate to a user that a data link has been established. In another embodiment, the local processor may control the indicator to indicate to a user each time the local processor receives the data communication link command from the remote processor of the interrogation device. In this embodiment, the user of the vehicle can determine based on the period between indications whether the vehicle is inside the transmission and reception range of the interrogation device.

In addition to providing apparatus and methods that process data bit by bit, prevent the propagation of false data, and establish data communication links, the present invention also provides apparatus and methods that either store data concerning the vehicle for later transmission or store data for later transmission to either one or several vehicles. These embodiments may also allow for high speed data transmission to either the vehicle or remote interrogation device.

Specifically, with reference to FIG. 31, an apparatus for storing data related to a vehicle for later transmittal is shown. In this embodiment of the present invention, the apparatus 66 includes a local transceiver 34 that is in operable electrical communication with the data bus and the transceiver is a local processor 36. Additionally, a local memory device 68 is in electrical communication with the local processor. In this embodiment of the present invention, during operation of the vehicle, the local processor receives data concerning systems of interest of both the vehicle and possibly the vehicle's cargo. This data is stored in the local memory device as historical data concerning the vehicle. This data may either be analyzed by the local processor or transmitted to a remote interrogation device during a later data transfer mode. As such, historical data concerning the vehicle and its contents may be recorded for analysis. This historical data may include such parameters as the average speed of the vehicle, accelerations, number of times the vehicle had abrupt stops, brake temperatures, temperature data of the trailer, data relating to the cargo, etc.

With reference to FIG. 31, the apparatus 66 of this embodiment may also include a remote memory device located in the remote interrogation device for storing data to be transmitted to either one or several vehicles. Specifically, in this embodiment of the present invention, the remote interrogation device 46 includes a remote processor 48 and a remote transceiver 50. Additionally, the remote interrogation device includes a remote memory device 70 in electrical communication with the remote processor. In this embodiment of the present invention, the remote memory device may include data related to either one vehicle, a group of vehicles, or all of the vehicles in a fleet. In this embodiment, when the interrogation device forms a data communication link with a vehicle designated to receive the data, the remote processor assesses the data and transmits it to the vehicle.

In addition to storing data for later transmission, the local and remote memory devices may also be used to transmit data either to or from the vehicle at high data speeds. This is advantageous where there is only a limited time for data transmission, such as where the vehicle is moving past the interrogation device. In this embodiment of the present invention, data concerning the vehicle may be stored in the local memory device and during data transmission, the local processor may transmit the data at data speeds exceeding the speed of the data bus. The transmitted data is received by the remote interrogation device and stored in the remote memory device until it can be processed. Similarly, data for transmission to a vehicle may be stored in the remote memory device, and when a data communication link is established, transmitted to the locate processor of the vehicle at data rates exceeding the data bus of the vehicle. The data is stored in the local processor until it can be applied to the data bus. As such, data can be transmitted in instances where the time for a data communication link is restrictive.

As detailed above, the present invention includes transceivers for transmission of data to and from a remote location from the data bus of the vehicle. It must be understood that the present invention may use any form of data communication to transmit the data. For instance, in one embodiment, the transceivers may be IR transceiver, while in another embodiment the transceivers may be either fiber optic or RF. Additionally, it must be understood that many different types of data protocol may be used. For example, in the case of IR, infrared data association protocol (IrDA) may be used. In case of RF, the data may be transmitted by any form of RF modulation including Frequency Shift Keyed (FSK), Pulse Width Modulation (PWM), etc. The communication, however, is preferably local or local area communication which has a limited distance.

The communication for the transceivers, however, could also be between a tractor and trailer for the case of IR particularly. For example, IR is particularly immune to electromechanical interferences and does not need a hard-wire or fiber optic link between the tractor and trailer. Between a tractor and trailer of a heavy duty vehicle, for example, the communication can be accomplished through a light housing, marker housing, or other communication housing with one positioned with a transceiver on the tractor and one housing with a transceiver positioned on the trailer.

In addition, the present invention may be adapted to use newly developed protocol and data communication systems. Specifically, the present invention is designed to interface with emerging technologies such as BLUETOOTH™. BLUETOOTH™ is an open specification for wireless communication of data and voice. It is based on a low-cost short-range radio link built into a microchip. Currently, the BLUETOOTH™ specification or standard is being considered for use as a new global wide specification for wireless communication. More information concerning BLUETOOTH™ is available via the Internet at the following website:

http://www.bluetooth.com/default.asp.

The present invention may also include embodiments that communicate with the computer system of a vehicle via a universal serial bus (USB). A USB bus is a newly developed data bus that is currently being implemented with many new communication and computer systems. Specifically, many systems that traditionally implement RS-232 serial data buses are now using USB data buses. In one embodiment of the present invention, the local processor of the vehicle may further include a connection to the USB data bus of the vehicle. In this embodiment of the present invention, the local processor may either receive data from or transmit data to the computer and subsystems of the vehicle via the USB bus. Data received from the USB data bus for transmission to a remote location, is received by the local processor and transmitted via the local transceiver as either RF or IR signals to a remote interrogation device.

As discussed above, the present invention uses an interrogation device to communicate with the data bus of the vehicle. It must be understood that the interrogation device may be many different type devices. For instance, the interrogation device may be a specifically designed unit or the interrogation device may be a communication device such as a cellular phone, pager, palm pilot, laptop, etch. That interfaces with the data bus and transmits the data similar to a modem to a remote location for data processing. The use of a cell phone, pager, palm pilot is useful, as it may allow the user to download information such as diagnostics concerning the vehicle roadside if the vehicle has system failures. For instance, if the vehicle malfunctions, the user may download data to a cell phone that is transmitted to a maintenance station, and the maintenance station may be able to transmit data back to the vehicle via the cell phone to repair the vehicle remotely.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

The invention claimed is:

1. A system for data communication associated with a vehicle, said system comprising:
   a first data communications apparatus associated with the vehicle;
   a second data communications apparatus associated with the vehicle;
   at least one electrical conductor operatively interconnecting said first and second data communications apparatuses, said at least one electrical conductor comprising a data bus for transmitting data between said first and second data communications apparatuses;
   a first data communications protocol adapted for transmitting vehicle data along said data bus;
   means for converting said first data communications protocol to a second data communications protocol, said second data communications protocol adapted for transmitting vehicle data from said data bus to a remote data communications terminal.

2. A system according to claim 1, further comprising a connector connected to said at least one electrical conductor, a transceiver housing operatively connected to said connector, and wherein one of said first and second data communications apparatuses comprises a transceiver positioned within said transceiver housing.

3. A system according to claim 2, wherein said connector includes a plurality of pins having a predetermined pin configuration and first and second connector portions, wherein said connector has one of either a generally cylindrical or a generally rectangular shape, and wherein the second connector portion defines said transceiver housing.

4. A system according to claim 2, wherein said first and second data communications apparatuses are adapted to interface with at least one electronic subsystem associated with the vehicle and related to operation of the vehicle.

5. A system according to claim 2, wherein said transceiver includes a signal processing physical layer, and wherein said data communications protocol uses only the physical layer of said transceiver for signal processing.

6. A system according to claim 4, wherein said at least one electronic subsystem comprises an anti-locking brake system connected to the vehicle, and wherein said connector is operatively connected to said anti-locking brake system.

7. A system according to claim 4, wherein said at least one electronic subsystem comprises means for monitoring tire pressure.

8. A system according to claim 1, wherein said first data communications protocol comprises one of the data communications protocols specified by SAE J1708, SAE J1939, and a universal serial bus standard.

9. A system according to claim 1, wherein said data bus comprises a RS 485 twisted pair.

10. A system according to claim 1, wherein said second data communications protocol comprises a wireless data communications protocol.

11. A system according to claim 10, wherein said wireless data communications protocol is selected from a group consisting of RF and IR.

12. A system according to claim 1, wherein said first data communications protocol comprises a wireless data communications protocol.

13. A system according to claim 1, wherein one of the first and second data communications apparatuses comprises a portable interrogation device operatively connected to said data bus of the vehicle.

14. A system according to claim 13, wherein said interrogation device is selected from a group consisting of a cellular phone, pager, PDA, and laptop computer.

15. A system according to claim 13, wherein said interrogation device comprises a handheld computer.

16. A system according to claim 1, wherein said first data communications apparatus is adapted to interface with at least one electronic subsystem associated with the vehicle, said electronic subsystem being selected from a group consisting of mirror tracking, mirror with trailer display, controls for reefer, controls for trailer slide, axle, controls for landing gear, active faring, recorder for trailer functions, satellite for trailer functions, brake system information, brake by wire, climate controls for reefer, mirror with trailer display, trailer identification, trailer brake temperature, trailer axle temperatures, trailer security, weight broadcast, trailer voltage status, vehicle speed optimization, engine speed optimization, implement display, and satellite control to implement GPS.

17. A system according to claim 1, wherein said second data communications apparatus is adapted to interface with at least one electronic subsystem associated with the vehicle, said electronic subsystem being selected from a group consisting of reefer temperatures, reefer pressures, trailer identification, blind spot warning, cargo information, smoke/fire detection, cargo shift, weight detection, anti-lock failure, brake by wire, backup lamps, suspension control, sliding axle control, liftable tailgate, tire pressure monitor, lamp outage monitor, stop lamp saver, water in air reservoir, liftable landing gear, brake temperature, emergency line pressure detection, blind spot warning, cargo information, tire pressure warning, smoke detector, roll over protection, active lighting, active tire pressure, backup alarm, inventory data collection, security warning, trailer engine start, trailer engine monitor, tractor/changing from reefer, trailer dome lamps, motorized rear door lift, sprayer pressure, speed planning rates, depth position, hydraulic controls, speed counting, and moisture sensing.

* * * * *